United States Patent
Breneman

(10) Patent No.: US 10,279,635 B2
(45) Date of Patent: May 7, 2019

(54) METHOD AND SYSTEM FOR VEHICLE TIRE INFLATION

(71) Applicant: Ford Global Technologies, LLC, Dearborn, MI (US)

(72) Inventor: Matthew Breneman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/440,965

(22) Filed: Feb. 23, 2017

(65) Prior Publication Data
US 2018/0236827 A1    Aug. 23, 2018

(51) Int. Cl.
| | |
|---|---|
| B60C 23/10 | (2006.01) |
| B60C 23/14 | (2006.01) |
| F02D 41/00 | (2006.01) |
| F02M 35/10 | (2006.01) |
| F02B 21/00 | (2006.01) |
| F02D 29/02 | (2006.01) |
| F02D 41/02 | (2006.01) |

(Continued)

(52) U.S. Cl.
CPC .............. *B60C 23/14* (2013.01); *B60C 23/16* (2013.01); *F02B 21/00* (2013.01); *F02D 29/02* (2013.01); *F02D 41/0007* (2013.01); *F02D 41/021* (2013.01); *F02M 35/10229* (2013.01); *F02D 41/045* (2013.01); *F02D 41/08* (2013.01); *F02D 2200/1002* (2013.01); *F02D 2200/50* (2013.01); *F02D 2200/60* (2013.01); *Y02T 10/6208* (2013.01)

(58) Field of Classification Search
CPC ... B60C 23/001; B60C 23/003; B60C 23/004; B60C 23/005; B60C 23/14; B60C 23/16

USPC ....... 123/198 C, 532, 533, 559.1, 559.2, 565
See application file for complete search history.

(56) References Cited

U.S. PATENT DOCUMENTS

| | | | | |
|---|---|---|---|---|
| 1,573,725 | A | * | 2/1926 | MacDonald ............ B60C 23/14 123/198 C |
| 1,590,705 | A | * | 6/1926 | Simpson ................. B60C 23/14 123/198 C |

(Continued)

FOREIGN PATENT DOCUMENTS

| | | |
|---|---|---|
| CN | 2260016 Y | 8/1997 |
| CN | 202163251 U | 3/2012 |
| CN | 203344665 U | 12/2013 |

OTHER PUBLICATIONS

Davies, A., "A Little Fan That Fixes the Turbocharger's Biggest Problem," Wired Website, Available Online at https://www.wired.com/2017/04/little-fan-fixes-turbochargers-biggest-problem/, Apr. 28, 2017, 10 pages.

*Primary Examiner* — Erick R Solis
(74) *Attorney, Agent, or Firm* — Julia Voutyras McCoy Russell LLP

(57) ABSTRACT

Methods and systems are provided for using a forced induction system as a source of compressed air to pressurize a portable pressure vessel for inflating tires. In one example, a method may include providing instructions to the operator to initiate the method which includes the operator coupling the portable pressure vessel to a connection port included on the induction passage of the induction manifold. Responsive to more than one operator input, a controller selectively opens a pick-up valve in the connection port, and operates a plurality of engine systems to boost pressure in the induction passage to fill the portable pressure vessel.

19 Claims, 7 Drawing Sheets

(51) Int. Cl.
  *B60C 23/16* (2006.01)
  *F02D 41/04* (2006.01)
  *F02D 41/08* (2006.01)

(56) References Cited

U.S. PATENT DOCUMENTS

| | | | |
|---|---|---|---|
| 1,621,179 A * | 3/1927 | Surlemont | B60C 23/00 |
| | | | 123/198 C |
| 1,799,122 A * | 3/1931 | Rocher | B60C 23/14 |
| | | | 123/198 C |
| 2,156,841 A | 5/1939 | Davis | |
| 3,101,111 A * | 8/1963 | Drechsel | B60C 23/003 |
| | | | 152/416 |
| 4,185,670 A * | 1/1980 | Sartell, Jr. | B60S 5/043 |
| | | | 116/137 R |
| 4,224,013 A | 9/1980 | Davis, Sr. | |
| 4,431,043 A * | 2/1984 | Goodell | B60C 23/001 |
| | | | 137/224 |
| 4,470,506 A * | 9/1984 | Goodell | B60C 23/003 |
| | | | 152/416 |
| 6,296,010 B1 | 10/2001 | DeLauer | |
| 6,688,104 B2 | 2/2004 | Baeuerle et al. | |
| 6,711,492 B1 | 3/2004 | Pursifull et al. | |
| 6,729,363 B2 * | 5/2004 | Stiller | B60C 23/14 |
| | | | 141/100 |
| 8,033,272 B2 | 10/2011 | Morizane et al. | |
| 8,479,791 B2 * | 7/2013 | Schulte | B60C 23/12 |
| | | | 152/419 |
| 9,227,600 B2 * | 1/2016 | Chen | B60S 5/04 |
| 2001/0042571 A1 * | 11/2001 | Fang | B29C 73/163 |
| | | | 141/4 |
| 2004/0216827 A1 * | 11/2004 | Stanczak | B60C 23/004 |
| | | | 152/419 |
| 2006/0220814 A1 * | 10/2006 | Kawashima | B29C 73/22 |
| | | | 340/442 |
| 2007/0044881 A1 * | 3/2007 | Skoff | B60C 23/002 |
| | | | 152/416 |
| 2010/0031934 A1 * | 2/2010 | Tayyari | F02B 21/00 |
| | | | 123/559.1 |
| 2010/0235044 A1 * | 9/2010 | Sawada | B60C 5/22 |
| | | | 701/36 |
| 2011/0315463 A1 * | 12/2011 | Penrod | B60K 6/00 |
| | | | 180/65.245 |
| 2014/0191859 A1 | 7/2014 | Koelsch | |
| 2017/0002671 A1 | 1/2017 | Waite et al. | |
| 2017/0113498 A1 * | 4/2017 | King | B60C 23/003 |

* cited by examiner

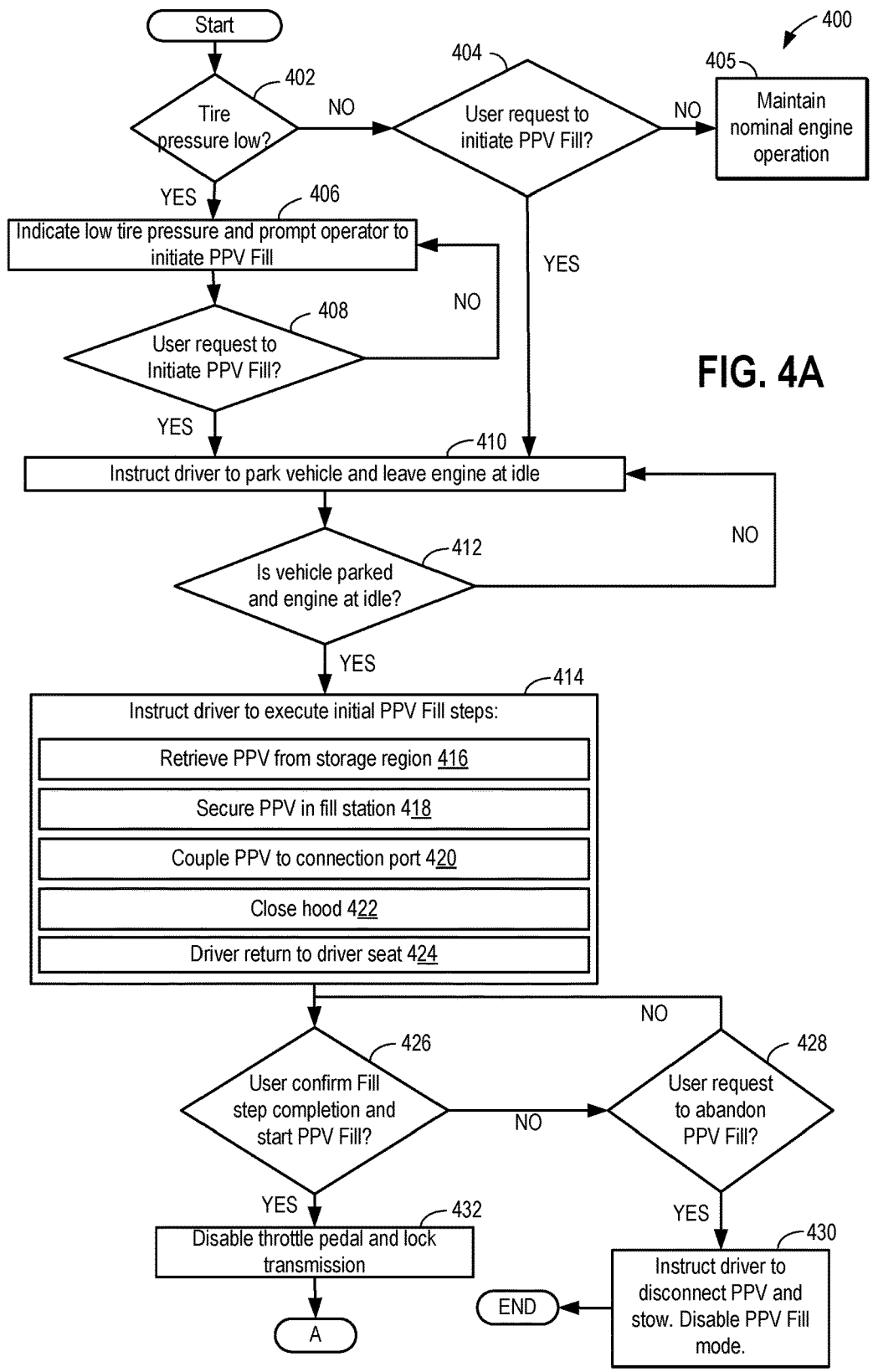

METHOD AND SYSTEM FOR VEHICLE TIRE INFLATION

FIELD

The present description relates generally to methods and systems for using a forced induction system on an engine to charge a portable pressure vessel.

BACKGROUND/SUMMARY

Flat tires can be inconvenient for vehicle drivers. Though some flat tire conditions, such as blow-outs or large punctures, immediately render tires unusable and in need of replacement, many flat tire conditions result in a slow leak needing a source of pressurized air to reinflate until service is available. While some aftermarket systems provide for portable pressurized canisters for addressing a tire leak, such systems can degrade over storage time such that when finally needed, they are ineffective. And even if effective, they may offer limited use.

In one approach shown by Chinese Patent CN2260016Y, the compressed air generated by a cylinder of an engine is used to inflate a tire. A mixed gas shut-off valve is provided to allow for pure air inlet into a cylinder, and a spark plug of the cylinder is replaced with a hose coupling the cylinder to a tire. Engine operation is used to direct compressed air from the cylinder to the tire.

The inventors herein have recognized the above noted, as well as additional issues with such systems. As one example with respect to CN2260016Y, a typical user may not have the ability to remove a spark plug from an engine and successfully reinstall the inflator hose without introducing contamination into the engine system. Further, a hose sufficiently long to reach between the engine compartment and all vehicle tires may be prohibitively long and susceptible to damage during use, rendering it useless. As another example, a reciprocating air pump comprising a plurality of moving components and valves may be costly and prone to degradation due to extremely intermittent use. In yet another example, use of an engine-driven compressor and reservoir may decrease engine output while adding weight and cost to a vehicle system. As noted above, relying on a pressurized canister requires the user to have a functioning canister on hand. Further, in the case where the pressurized canister includes sealant, the sealant may become ineffective if stored for a duration longer than manufacturer recommendations, and the messy residue left by the sealant may require prompt and professional repair of the tire and may damage tire pressure sensors.

The inventors herein have recognized that a portable pressure vessel (PPV) fillable by a forced induction system coupled to an engine can advantageously provide the functionality of an on-board air pump. And at the same time, specific engine control and operating procedures can be coordinated to enable increased performance and ease of use. In one example, the issues described above may be addressed by a vehicle system comprising: an engine; a forced induction system coupled to an intake passage of the engine; a drivetrain with a tire; and a portable pressure vessel releasably coupleable to the forced induction system via a connection port, and further releasably coupleable to the tire. In this way, a reliable source of compressed air can be provided on-board a vehicle in case of an emergency, without requiring heavy and costly air pumps, and without affecting driving performance.

As an example, responsive to an operator request for initiating fill of am on-board portable pressure vessel during an engine idle condition, a vehicle controller may display to the operator a plurality of instructions that include enabling the operator to couple the portable pressure vessel to a forced induction system of a vehicle engine at a designated connection point. After confirming that the operator has connected the PPV at the designated connection point, and upon further confirming that refilling conditions are met (for example, that the engine is at idle, the hood has been closed and the operator has returned to the driver seat in the vehicle), boost pressure may be actively increased by operating the forced induction system according to a predetermined cycle. For example, boost pressure may be increased by operating the engine at an increased speed and/or at a higher load. The boost pressure applied may be higher than necessitated based on operator torque demand. The generated boost (e.g., compressed air) is directed to the portable pressure vessel through a connection port in the forced induction system. Once the PPV has been sufficiently filled, the forced induction system may resume nominal operation, and instructions may be displayed to the operator to disconnect the PPV from the forced induction system and proceed with tire inflation.

In this way, an existing forced induction system of a vehicle system may be advantageously used as an emergency source of compressed air for inflating tires. By reducing the need for a dedicated, constantly activated air pump and reservoir system, significant cost reduction and component reduction benefits can be achieved while providing a simple, low-cost, and reliable solution for inflating tires. The portable pressure vessel may be configured to be small enough to be easily depressurized and conveniently stowed during non-use. By ensuring that the PPV is stowed in a depressurized condition, the pressure vessel is rendered inert when not in use. By performing the PPV fill function during an engine idle condition, vehicle performance is not affected during filling of the PPV using the forced induction system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4B show a flowchart illustrating a routine that may be implemented to operate a turbocharger to generate compressed air for filling a portable pressure vessel.

DETAILED DESCRIPTION

Figure 1:
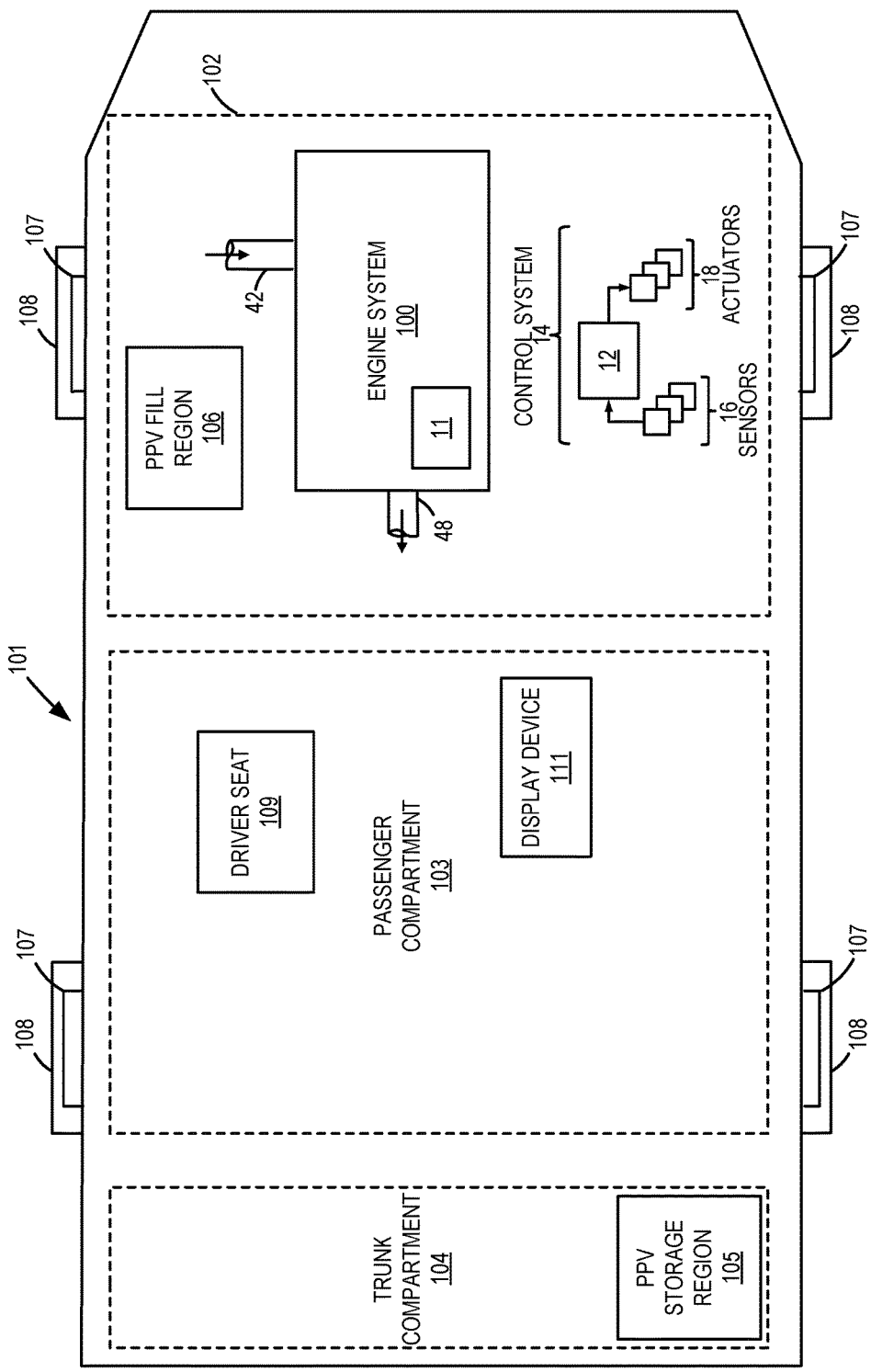
FIG. 1 schematically shows an example embodiment of a vehicle system.

The following description relates to systems and methods for a vehicle, such as the vehicle system of FIG. 1. The vehicle system comprises an engine having forced induction capabilities, such as the boosted engine system of FIG. 2 having a turbocharger. Control of the forced induction system during vehicle operation may be according to a controller routine, such as the example routine shown in FIG. 3. Additionally, the controller may be configured to perform a routine responsive to at least one user request, such as the example routine of FIGS. 4A-4B, to use the forced induction system to fill a portable pressure vessel. A prophetic example operation of routine forced induction system for filling a portable pressure vessel is shown in FIGS. 5A-5B. In this way, compressed air may be provided on-board a vehicle for tire inflation.

Turning now to FIG. 1, an example embodiment of a vehicle system 101 is illustrated schematically (not to scale). In one example, vehicle system 101 may be configured as an on-road motor vehicle. However, it will be appreciated that in other examples vehicle system 101 may be configured as an off-road vehicle or a hybrid vehicle. Vehicle system 101 may have a plurality of drive wheels 107 coupled to a plurality of air-inflated tires 108. In addition, vehicle system may be divided into include a trunk compartment 104 that may be used for storing cargo or a spare tire, a passenger compartment 103 which may include a driver seat 109 and a display device 111, and an under-hood compartment 102. Under-hood compartment 102 may house various under-hood components under the hood (not shown) of motor vehicle 101. For example, under-hood compartment 102 may house an internal combustion engine system 100.

Internal combustion engine system 100 has a combustion chamber which may receive intake air via an intake passage 42 and may exhaust combustion gases via an exhaust passage 35. Engine system 100 may be configured as a boosted engine having a forced induction system 11 (such as a turbocharger) that enables intake air (at ambient pressure) drawn in via intake passage 42 to be pressurized before delivery to the combustion chambers. A detailed embodiment of the engine system including the forced induction system is provided at FIG. 2.

Figure 2:
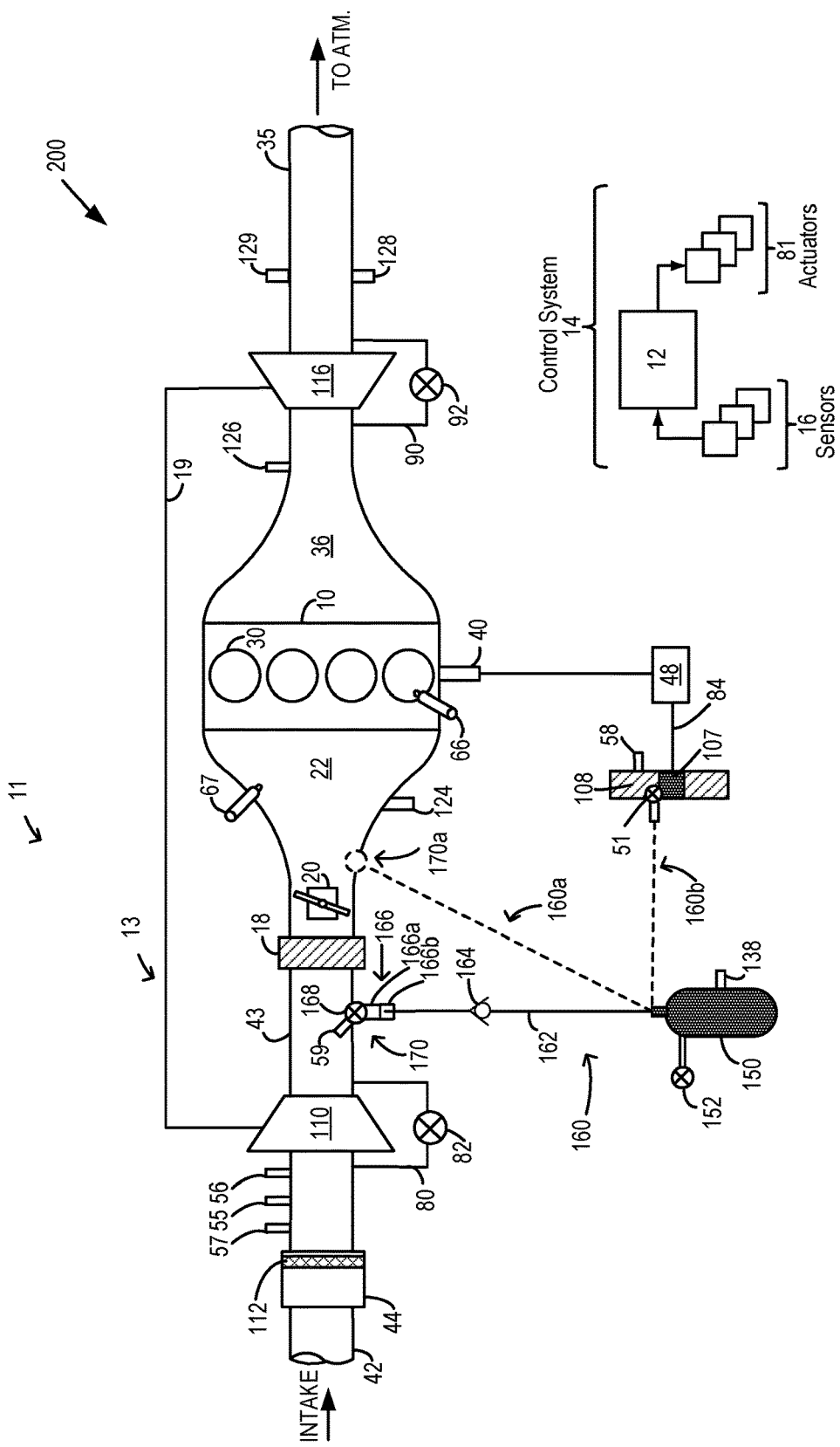
FIG. 2 shows an example embodiment of an engine system having a forced induction system coupled to a vehicle engine.

During vehicle travel, tires 108 may become deflated or depressurized. During such conditions, it may be convenient for a vehicle operator to have a source of compressed air for refilling the tires readily available on-board the vehicle. To enable on-board tire inflation, motor vehicle 101 may be configured with an on-board portable pressure vessel 150 as shown in FIG. 2. In one example, the portable pressure vessel 150 may be constructed of a metal alloy, which has the benefit of reduced cost. In alternate examples, the portable pressure vessel may be constructed of composite materials, which have the benefit of reduced weight. Examples of composite materials may include filament overwrap of fiberglass or carbon fiber.

The PPV may be configured to be small enough to be conveniently stowed in a storage region 105. The storage region 105 comprises a pocket that is shaped to receive and hold the PPV and may be positioned entirely within one or more of the passenger compartment 103, the under-hood compartment 102, the trunk compartment 104, or proximate a spare tire (not shown) stored in the motor vehicle 101 during conditions of non-use. In the depicted example, the storage region 105 is located entirely within the trunk compartment 104. However, it will be appreciated that in other examples the PPV storage region 105 may be contained in the passenger compartment, the under-hood compartment, or proximate a spare tire (not shown). In some embodiments, the storage region may include a coupling that would automatically open one of the valves on the PPV when it is coupled to the storage region, allowing it to vent to atmosphere. In one example, a pneumatic coupling may be used to couple the PPV to the storage region such that the pneumatic coupling would open a relief valve coupled to the PPV, allowing any compressed air inside the PPV to vent to atmosphere. In other embodiments, the PPV may include a slow-release vent (not shown) to allow residual pressure in the PPV to slowly dissipate when stowed and not in use. This would not affect the PPV from holding pressure temporarily, and would ensure the PPV is depressurized during non-use. In further embodiments, the PPV may include one or more valves including a check valve.

When tire inflation is requested, a vehicle controller may display instructions to the vehicle operator on display device 111 that enable the PPV to be filled using compressed air drawn from the forced induction system of the engine. In particular, the instructions may assist the operator in moving the PPV from the storage region 105 to a fill region 106. The fill region 106 comprises a pocket that is shaped to receive and hold the portable pressure vessel 150, the fill region 106 positioned entirely within the under-hood compartment 102 and positioned such that when the PPV 150 is coupled to the fill region 106, a vehicle hood (not shown) may be closed. In the depicted example, the PPV fill region 106 is contained entirely within the under-hood compartment 102. However, it will be appreciated that in other examples the PPV fill region 106 may be contained in the passenger compartment 103 or the trunk compartment 104. Additionally, the instructions may assist the operator in coupling the PPV to the engine system downstream of a turbocharger compressor and upstream of a throttle as elaborated at FIG. 2.

Engine system 100 may further include control system 14. Control system 14 is shown receiving information from a plurality of sensors 16 (various examples of which will be described with reference to FIG. 2) and sending control signals to a plurality of actuators 81 (various examples of which will be described with reference to FIG. 2). The control system 14 may include a controller 12. The controller may receive input data from the various sensors, process the input data, and employ the various actuators based on the received signals and instructions stored on a memory of the controller.

FIG. 2 schematically shows aspects of an example engine system 200 such as engine system 100 of FIG. 1. Engine system 200 may be included in a propulsion system such as in an on-road vehicle system 101. In one example, the on-road vehicle is a hybrid electric vehicle. In the depicted embodiment, the engine system includes an engine 10, which is coupled to a forced induction system 11 including a boosting device 13. In the depicted example, the boosting drive 13 is a turbocharger that comprises a turbine 116 positioned in the exhaust passage 35 coupled to a compressor 110 via a shaft 19. Compressor 110 is positioned in the intake passage 42 upstream of a charge air cooler 18 (also referred to herein as CAC) and a throttle 20.

Engine 10 receives air along intake passage 42 via an air box 44 including air cleaner 112. The air is compressed by boosting device 13 and compressed air is delivered to induction passage 43. The compressed air passes through the induction passage 43, through the CAC 18 to cool, and through the throttle 20 before entering the induction manifold 22 where it enter the engine 10. In other words, compressor 110 is coupled through charge air cooler 18 to intake throttle 20 and intake throttle 20 is coupled upstream of induction manifold 22. The charge-air cooler may be an air-to-air or water-to-air heat exchanger, for example. In the embodiment shown in FIG. 2, the pressure of the air charge within the induction manifold is sensed by a manifold air pressure (MAP) sensor 124.

Turbocharger 13 includes compressor 110 mechanically coupled to turbine 116 via shaft 19, the turbine 116 driven by expanding engine exhaust. However, other combinations and configurations of boosting devices may be possible. In one embodiment, the turbocharger may be a twin scroll device. In another embodiment, the turbocharger 13 may be a variable geometry turbocharger (VGT), where turbine geometry is actively varied as a function of engine operating conditions. In yet another embodiment, engine system 100 may comprise a supercharger or both a supercharger and turbocharger. For an embodiment that includes a supercharger, compressor 110 may be at least partially driven by an electric machine and/or the engine 10, and may not include turbine 116.

In some examples, compressor 110 may include a CRV 82 across compressor 110. The depicted example shows a recirculation passage 80 with CRV 82 for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of the charge air cooler to the compressor inlet or compressor bypass for dissipating compressed air to atmosphere. The CRV 82 may be a continuously variable valve wherein a position of the valve is continuously variable from a fully closed position to a fully open position. In some embodiments, compressor recirculation valve 82 may be normally partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110 as shown in FIG. 2. For example, a temperature sensor 55 may be coupled to the inlet for estimating a compressor inlet temperature. As another example, a pressure sensor 56 may be coupled to the inlet of the compressor for estimating a pressure of air charge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. One or more sensors may also be coupled to intake passage 42, upstream of compressor 110, for determining a composition and condition of air charge entering the compressor. These sensors may include, for example, a manifold air flow sensor 57.

Induction manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system 100.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as specified for desired combustion and emissions-control performance. Additionally, a variable cam timing device (not shown) may be actuated to adjust the timing of the intake and exhaust valves (not shown) to a timing that provides decreased positive intake to exhaust valve overlap. That is to say, the intake and exhaust valves will be open for a shorter duration and will move away from being simultaneously open for a portion of the intake stroke.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

As shown in FIG. 2, exhaust from the one or more exhaust manifold sections is directed to turbine 116 to drive the turbine. When reduced turbine torque is desired, some exhaust may be directed instead through a waste-gate 90, bypassing the turbine 116. Waste-gate valve 92 may be actuated open to dump at least some exhaust pressure from upstream of the turbine 116 to a location downstream of the turbine via waste-gate 90. By reducing exhaust pressure upstream of the turbine 116, turbine speed can be reduced. In one embodiment, waste-gate valve 92 may be a vacuum actuated, that is, it may be actuated via the application of vacuum. The combined flow from the turbine 116 and the waste-gate 90 then flows through emission control (not shown) before all or part of the treated exhaust may be released into the atmosphere via exhaust passage 35. Depending on operating conditions, however, some exhaust may be diverted instead to the intake passage via an EGR passage (not shown) including an EGR cooler and an EGR valve. In one example, EGR may be recirculated to the inlet of compressor 110.

During conditions when there is a transient increase in driver torque demand, such as during a tip-in, when going from engine operation without boost to engine operation with boost, the throttle 20 opening may be increased to increase air flow to the engine. The opening of the waste-gate valve 92 may decreased to increase the flow of exhaust gas through the turbine 116, which increases the speed of the turbine. In one example, the waste-gate valve 92 may be completely closed. The increased speed of the turbine drives the compressor 110.

During conditions when there is a decrease in driver torque demand, such as during a tip-out, when going from engine operation with boost to engine operation without boost, or reduced boost, the throttle 20 opening may be decreased. In one example, the throttle 20 opening may be closed. In another example, the CRV 82 may be opened so that the higher speed of the turbine 116 does not overwhelm the compressor 110 and cause compressor surge. The waste-gate valve 92 is also opened to increase the flow of exhaust gas bypassing the turbine 116 and reduce turbine speed. This allows excess boost pressure to be substantially immediately relieved. An example turbocharger operation is shown in reference to FIG. 3.

During conditions when engine 10 is idling and the vehicle is stopped, the intake throttle may be opened just enough to keep the engine running. In other examples, such as where the engine includes an idle control valve, the intake throttle may be fully closed while the idle control valve is opened so that sufficient air is delivered to the engine to keep the engine idling. As such, during engine idling conditions, the compressor 110 may not be spinning.

Engine torque from engine 10 may be transferred to a vehicle wheel 107 via powertrain shaft 84. Motor vehicle 101 may have any number of wheels 107. Specifically, engine torque may be relayed from a crankshaft 40 to a transmission 48, and thereon to the wheels 107. Transmission 48 may be a fixed ratio transmission including a plurality of gear ratios to allow engine 10 to rotate at a different speed than wheels 107. The wheels are coupled to inflatable tires 108 to provide shock absorption and provide a comfortable ride for the motor vehicle 101 operator. Each tire may include a tire pressure sensor 58 for determining the internal air pressure of the tires, and a tire valve stem 51 for inflating and deflating tires. Transmission 48 may be automatic, wherein operating conditions determine transmission gear, or manual, wherein the operator selects transmission gear. A clutch (not shown) may be provided between engine crankshaft 40 and transmission 48. By changing a torque transfer capacity of the clutch (e.g., an amount of clutch slippage), an amount of engine torque relayed to the wheels via the powertrain shaft may be modulated.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include MAP sensor 124, exhaust temperature sensor 128, exhaust pressure sensor 129, compressor inlet temperature sensor 55, compressor inlet pressure sensor 56, manifold air flow sensor 57, and pick-up valve sensor 59. Other sensors such as additional pressure, temperature, air/fuel ratio, and composition sensors may be coupled to various locations in engine system 100. The actuators 81 may include, for example, throttle 20, compressor recirculation valve 82, waste-gate valve 92, a pick-up valve 168, direct fuel injector 66, and port fuel injector 67.

The control system 14 may include the controller 12. The controller may receive input data from the various sensors, process the input data, and employ the various actuators based on the received signals and instructions stored on a memory of the controller. The controller 12 may employ the actuators 81 in response to the processed input data based on instruction or code programmed therein corresponding to one or more routines, such as example control routines described herein with regard to FIGS. 3, 4A and 4B. As one example, the controller may send a signal to an actuator of the waste-gate valve to increase or decrease the opening of the waste-gate valve to accordingly decrease or increase the rotation speed of the exhaust turbine driving the compressor of the turbocharger.

The control system 14 may include display device 111 for enabling operator input (e.g., a keyboard, a touch screen) and conveying instructions and messages to the operator. In one example, the display device 111 is coupled to the controller 12. When the controller receives a first operator input to fill the PPV, an instruction set may be sent to the operator from the controller 12 via the display device 111. In one example, the instruction set may include directing the operator to park the vehicle and prompting the operator through the process of retrieving the PPV 150 and coupling it to the induction passage 43 so that it can be filled. As a result of following the instruction set generated in response to the first operator input, in one example, the operator may park the vehicle and maintain an engine idle condition, and couple the PPV 150 to a connection port 170 included in the induction passage 43 so that it may be filled. Further detail regarding an example instruction set for the operator is shown with reference to FIGS. 4A-4B. In one example, the vehicle control system 14 may be coupled to a network such as a cloud-based network. In addition, the vehicle may be coupled to a remote server and the controller of one or more other vehicles. Additionally, the vehicle control system 14 may be coupled to a mobile device of the operator via cloud-based communication and so messages pertaining to engine operation or vehicle system status may be communicated to the driver though the operator's mobile device.

In addition to using the boosting device 11 for providing a transient boost pressure, responsive to an operator input, the boosting device may be advantageously used to generate compressed air for temporary storage in the portable pressure vessel 150. As a result, the boosting device may provide a reliable, on-board source of compressed air for one of more vehicle components including components external to engine 10. For example, compressed air from the PPV 150 may be used for inflating tires 108 of wheels 107 through a tire inflation valve 109, or for providing air to an air suspension system of the vehicle.

During the PPV fill function, the engine operates in such a manner to allow the engine to generate increased boost pressure in the induction passage and induction manifold without requiring an increase in engine load or torque output to the rest of the powertrain. In one example, increasing boost pressure in the induction passage and the induction manifold may be achieved by reducing the opening of the waste-gate valve, thereby reducing the quantity of exhaust gas bypassing the turbine compared to normal engine idle operation. In another example, increasing boost pressure in the induction passage and the induction manifold may be achieved by increasing engine speed to generate an increase in exhaust gas through the turbine, thereby increasing the speed of the compressor to provide increased boost pressure to the induction passage and induction manifold. In further examples, decreasing the opening of the throttle (e.g., decreasing the opening of the throttle plate) and/or retarding camshaft timing may restrict the amount of fresh air that is provided to the cylinders for combustion. Each of these systems must be actively controlled by the controller to maintain the increased boost condition of the induction passage while also reducing the likelihood of detonation. Consequently, the intake passage need not be sealed to provide the pressurized condition, as flow of air out of the plenum and into the cylinders will be restricted by the throttle plate and valve timing.

Specifically, in response to a first operator input indicating a request to fill the PPV (described further with reference to FIGS. 4A-4B), and following sensor input indicating the operator has successfully coupled the PPV to the connection port, closed the vehicle hood, and returned to the driver seat, the controller 12 may prompt the operator to confirm completion of the instruction set and the desire to start filling the PPV 150. In one example, if the operator provides the second operator input confirming completion of the initial instruction set and the desire to fill the PPV, the controller 12 may disable the throttle pedal and lock the transmission to ensure the vehicle cannot be propelled when filling the PPV 150. Additionally, the controller may open the connection port 170 and selectively operate boosting device 11 to deliver compressed air into induction passage 43. In one example, opening the connection port 170 may include opening the pick-up valve 168 to fluidically couple the induction passage 43, at a location downstream of the compressor and upstream of the throttle 20, to PPV 150. By opening the pick-up valve 168, compressed air can flow from induction passage 43 into PPV 150. In addition, closure of pick-up valve 168 when not filling the PPV enables the connection port to be sealed, thereby preventing leakage of compressed air during regular engine operation. In the current embodiment, the connection port 170 includes pick-up valve 168, a pick-up valve sensor 59 and a first component 166*a* of a pneumatic coupling 166. In one example, connection port 170 may be coupled to the induction passage 43 downstream of the compressor 110 and upstream of the CAC 18. In other examples, the connection port may be located downstream of the CAC 18, as denoted by dashed circle 170*a*. Additionally, the pick-up line may be coupled to the connection port 170*a* downstream of the CAC 18, as shown by dashed line 160*a*. It will be appreciated that included subcomponents of the pick-up line 160 and the connection port 170 are not shown in the alternate embodiments 160*a* and 170*a* for simplicity. In a further embodiment, where the engine system is configured with two compressors staged in series, the portable pressure vessel may be coupled to the intake passage 42 between a first, upstream compressor and a second, downstream compressor (not shown).

In one example, a common (e.g., Schrader-type) valve may be added as a PIA component to the induction passage or induction manifold, which would allow the same pressurized gas connection method for the vessel charging and tire fill procedures. The schrader valve on the intake may be located in a conspicuous location for easy access, as well as maintaining a suitable distance from vehicle and engine components that may cause interference during PPV usage.

In the present example, the PPV is fitted with an air pick-up line 160. The air pick-up line may comprise a hose 162 with a second component 166*b* of pneumatic coupling 166 coupled to the end of the hose, opposite the PPV 150. By coupling the first component 166*a* and the second component 166*b* of pneumatic coupling 166, the PPV 150 and the induction passage 43 may be fluidically connected by opening the pick-up valve 168. In other embodiments, PPV 150 may include multiple pick-up lines (e.g., one adapted for a connection port and PPV filling and a separate one adapted for the tire valve stem and tire inflating). In other embodiments, the connection port 170 may be configured so that a single pneumatic coupling may be used to couple the air pick-up line to both the connection port 170 and the tire valve stem 51. In one example, this may include a common Schrader-type valve added as a PIA component to the induction passage or induction manifold (e.g., with an appropriate coupling). In further embodiments, pick-up line 160 may utilize one additional fitting, such as an air chuck or grip chuck to be coupled to the first component of the pneumatic coupling 166 in order to mate with tire valve stem 51 and allow the operator to control the amount of pressurized air that flows to tire 108. The pick-up line is shown coupled to the tire valve stem by the dashed line 160*b*. A check valve 164 may also be included in air pick-up line 160 to prevent back-flow when pressure in the induction passage 43 is lower than the pressure in the portable pressure vessel 150.

In response to the second operator input, the controller 12 may open pick-up valve 168 to allow compressed air to be drawn from the induction passage and enter the portable pressure vessel 150 for later use. In one example, the second operator input differs from the first operator input in that the first operator input includes the operator pressing a first button on the display device 111 indicating that the operator wants to initiate the process of filling the PPV 150, whereas the second operator input includes the operator pressing a second button on the display device 111 indicating that the operator has completed the initial set of instructions generated in response to the first operator input and that the operator wishes to commence filling the PPV with compressed air. In another example, all the instructions generated by the controller in response to the first operator input must be completed and specific conditions must be met before the second operator input can be received by the controller 12. In one example, the PPV 150 must be coupled to the connection port 170, the vehicle hood must be closed, and the operator must return to the driver seat 109 as confirmed by sensor 16 signals delivered to the controller 12. In another example, conditions include sensors 16 confirming the transmission 48 is in park gear and the engine 10 is at idle condition must be completed prior to the controller prompting for and receiving the second operator input. In one example, a pressure sensor 138 may be coupled to the PPV 150 for estimating an amount of positive pressure available. In one example, pressure sensor 138 may include a regulator (not shown). In other examples, a relief valve 152 may be coupled to the PPV to prevent excessive pressurization.

When the air pick-up line 160 is coupled to the induction passage 43 and the specified conditions are met as will be described herein with reference to FIGS. 4A-4B, the pick-up valve 168 may be opened to fluidically couple the induction passage and the PPV 150. By coupling the two volumes, the pressure of the combined volume moves toward equilibrium and the pressure in the induction passage 43 attempts to equalize with the pressure in the PPV. That is to say, if the pressure in the induction passage 43 is greater than the pressure in the PPV, and above the relief pressure of the check valve 164, then the higher pressure air from the induction passage 43 will flow through the open pick-up valve 168 and through the pick-up line 160 into the PPV 150. As a result, pressure in the induction passage 43 will decrease and the pressure in the PPV 150 will increase until the induction passage and the PPV are at the same pressure. A pick-up valve sensor 59 may be coupled to the pick-up valve 168 as shown in FIG. 2. The pick-up valve sensor may indicate whether or not pick-up line 160 is coupled to the pick-up valve. In alternate embodiments, pick-up valve sensor 59 may also be an air pressure sensor.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3:
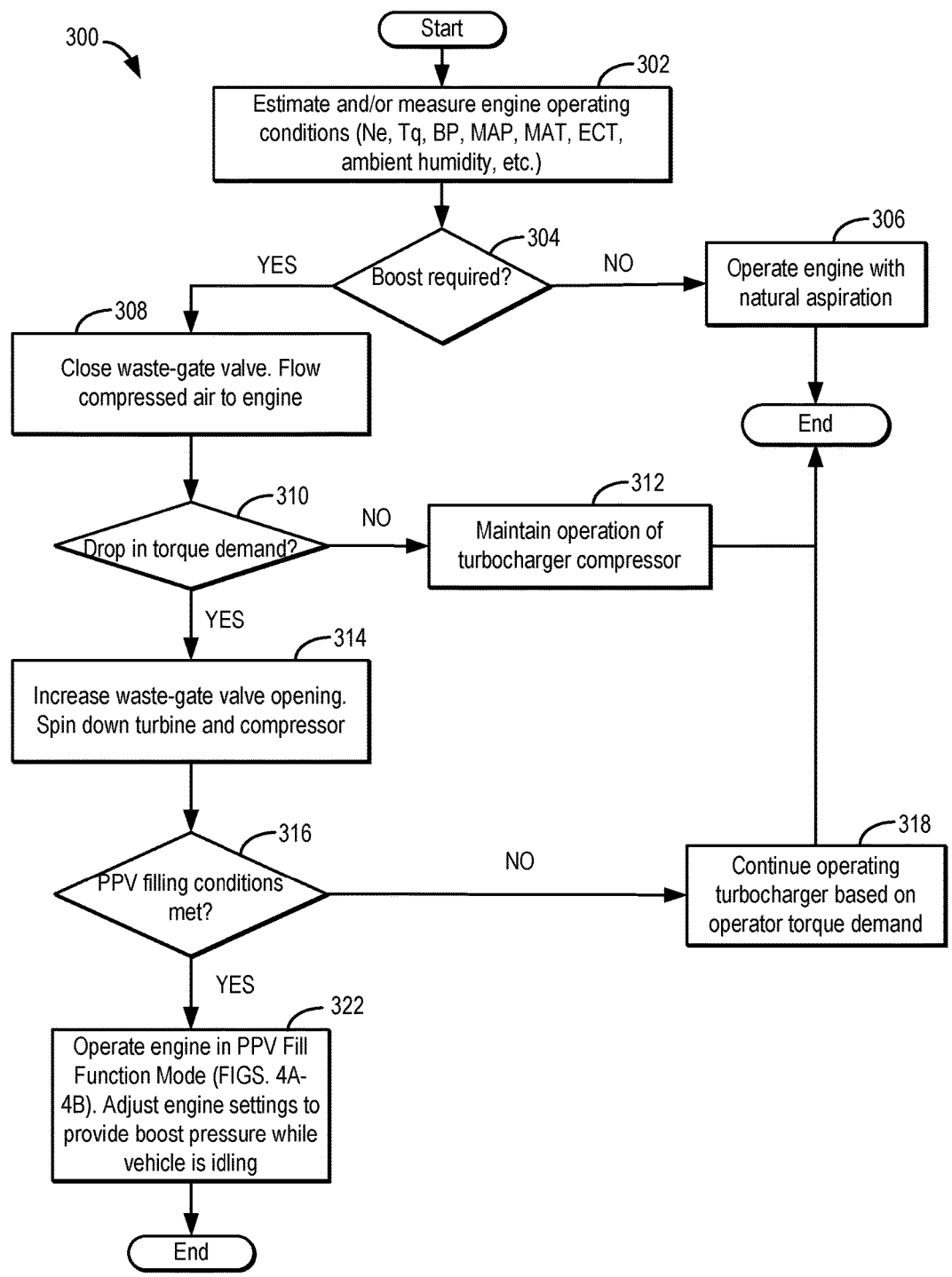
FIG. 3 shows a high level flowchart illustrating a routine that may be implemented to operate a forced induction engine system including a turbocharger.

Turning now to FIG. 3, an example routine 300 is shown for operating a compressor of a boosting device (e.g., a turbocharger) during selected conditions to provide transient boost response and upon operator request, providing a reliable on-board source of compressed air. Instructions for carrying out routine 300 and the rest of the methods included herein may be executed by at least one of the controller, an operator input, and signals received from sensors of the engine system, such as the sensors described above with reference to FIG. 2. The controller may employ engine actuators of the engine system to adjust engine operation, according to the methods described below.

At 302, the method includes estimating engine operating conditions, such as engine speed, pedal position, operator torque demand, ambient conditions (ambient temperature, pressure, humidity), engine temperature, manifold air pressure (MAP), manifold air flow (MAF), etc. At 304, the method includes determining if boost is demanded. In one example, boost may be demanded at mid-high engine loads. In another example, boost may be demanded in response to an operator pedal tip-in or increase in driver torque demand. If boost is not demanded, such as when the engine load is low or the driver torque demand is low, the method moves to 306 wherein the engine is operated with natural aspiration. Additionally, in response to engine idling condition being met, the engine and turbocharger may be operated at a predetermined set point based on ambient conditions such as ambient temperature, pressure, and humidity. Engine temperature and run time (e.g. whether the engine is in a cold start condition or is sufficiently warmed up) may also determine set points for the engine idle condition (e.g., a first idle condition). In one example, during a first engine idling condition, the engine is operated with an exhaust waste-gate valve open, an intake throttle less open, and with an intake manifold at barometric pressure.

If boost is demanded, then at 308, the method includes, reducing an opening of the waste-gate valve coupled to the waste-gate 92 across the turbine 166. In one example, the waste-gate valve 92 is fully closed. By closing the waste-gate valve 92, a larger portion of exhaust gas is drawn through the turbine instead of bypassing the turbine through the waste-gate. In response to increase in turbine speed, the compressor is accelerated and compressed air is delivered to the engine 10.

In an alternate embodiment, the boosting device may comprise both a turbocharger and an electrically-driven supercharger wherein a first, upstream compressor is driven by an electric motor (not shown) using power drawn from a battery (not shown) and a second, downstream compressor is driven by an exhaust turbine. For example, the controller may send a duty cycle signal to an electromechanical actuator coupled to an electric motor of the supercharger to rotate the motor at a higher speed, thereby spinning the first compressor via the electric motor. The duty cycle signal sent to the electric motor may be determined as a function of the requested boost. For example, as the demanded boost pressure increases, the duty cycle commanded to the electric motor may be increased to increase the rotation speed of the electric motor, and thereby the first compressor. As such, electric superchargers may have a response time (that is, idle to 100% duty cycle) of 130-200 ms and therefore may be able to deliver boost much faster compared to a typical turbocharger response time (1-2 seconds). Therefore, the compressor of an electric supercharger may be able to fill the turbo lag while the turbine of the turbocharger spins up, increasing boost pressure.

At 310, the method includes determining whether there is a drop in operator torque demand. In one example, a drop in boost may occur at low engine loads or when operator torque demand is low. In another example, a drop in boost demand may be in response to an operator pedal tip-out. If there is no drop in operator torque demand, then the turbocharger continues to operate with the waste-gate valve partially closed. If there is a drop in operator torque demand, then at 314, the method includes increasing the opening of the waste-gate valve 92. By increasing the opening of the waste-gate valve 92, the amount of flow bypassing the turbine 116 is increased, thereby allowing the turbine and compressor to spin down. In one example, the waste-gate valve may be fully opened.

At 316, the method includes determining whether the conditions for PPV filling are met. In one example, PPV fill conditions are met when the controller 12 receives a low tire pressure indication from tire pressure sensor 58 and in response prompts the operator to initiate the PPV Fill routine. In another example, PPV conditions are met when the controller 12 receives, through the display device 11, a first operator input requesting to initiate the PPV fill routine. If conditions are not met to initiate the PPV Fill routing at 316, then at 318, the method includes continuing to operate the compressor and turbine to meet operator torque demand. If PPV filling conditions are met, then at 322, the method includes initiating the PPV Fill routine, such as the example PPV Fill routine shown in FIGS. 4A-4B. Therein, after a first operator input requesting to fill the PPV 150, the controller 12 instructs the operator to follow instructions to execute a series of steps to prepare the PPV for filling, and then, in response to a second operator input, the controller may open a pick-up valve 168 and adjust engine actuators to increase boost pressure in the induction passage 43 of engine 10 while the vehicle is idling (e.g., not propelled). After the PPV is filled, the induction passage and the PPV are fluidically decoupled by closing the pick-up valve wherein the engine returns to nominal operation based on operator torque demand. The operator may then retrieve the PPV from the fill region to assisting with inflating tires.

Figure 4B:
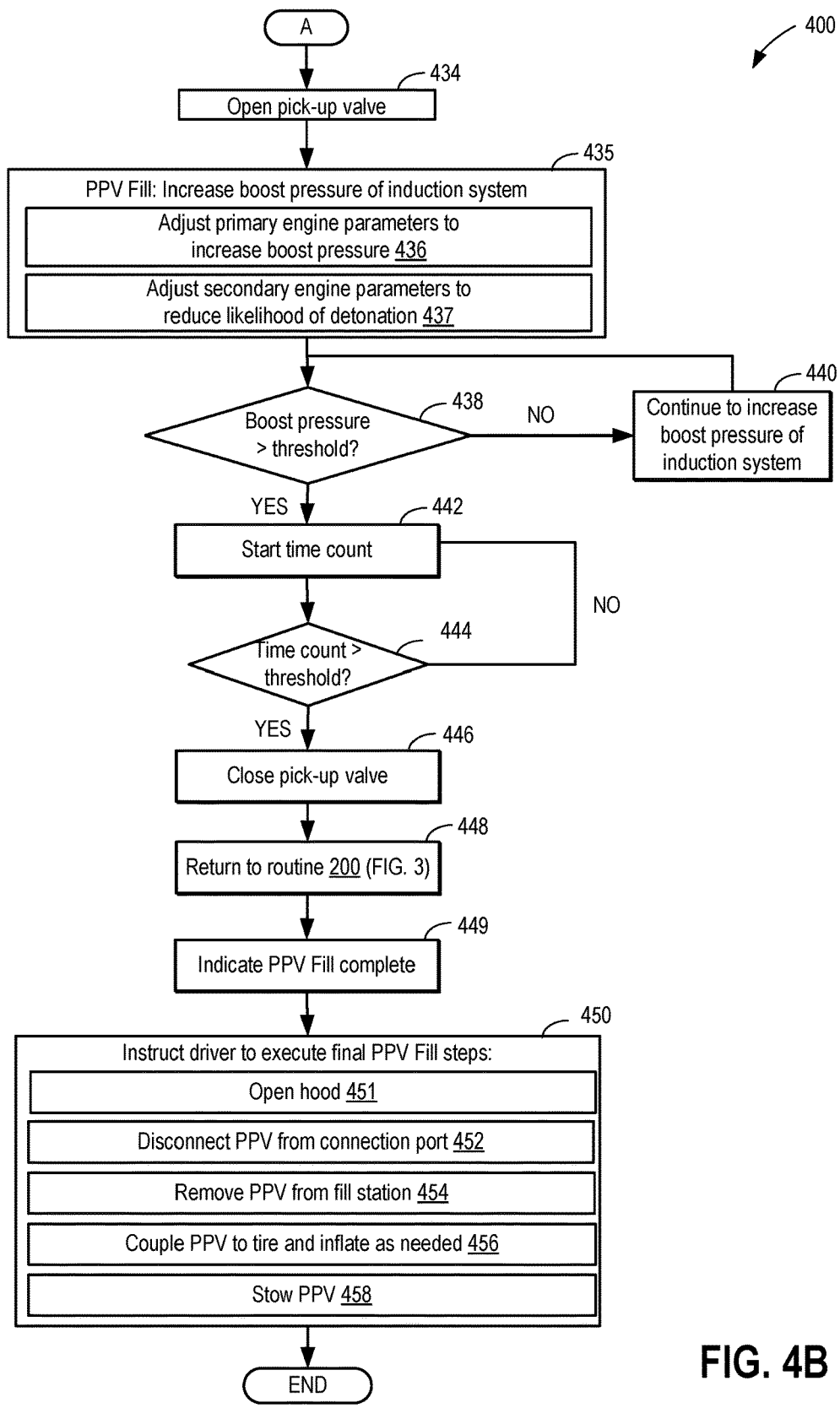
Figure 5A:
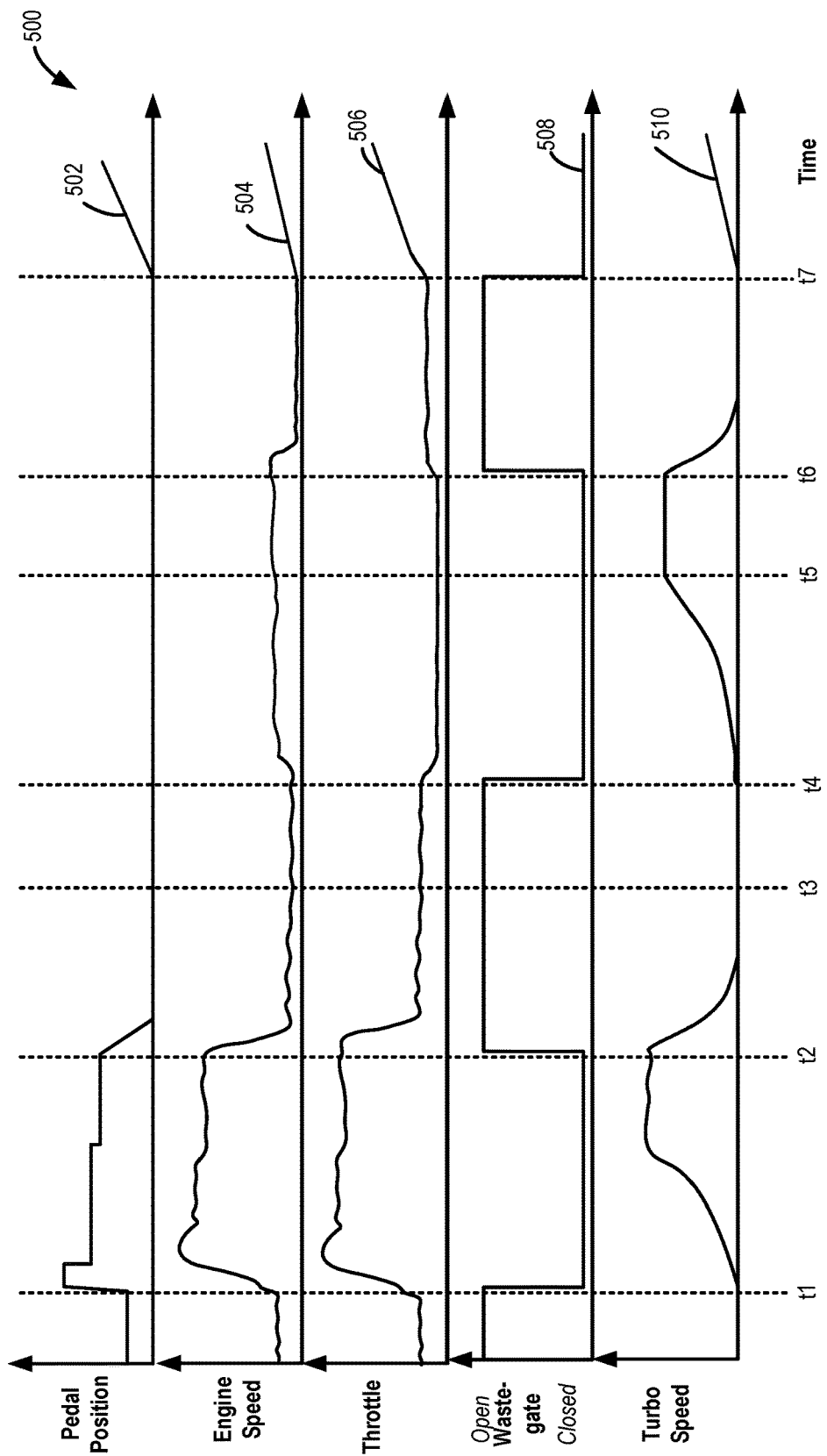
FIGS. 5A-5B show an example operation of a turbocharger during a controlled boost condition to generate compressed air for filling a portable pressure vessel.
Figure 5B:
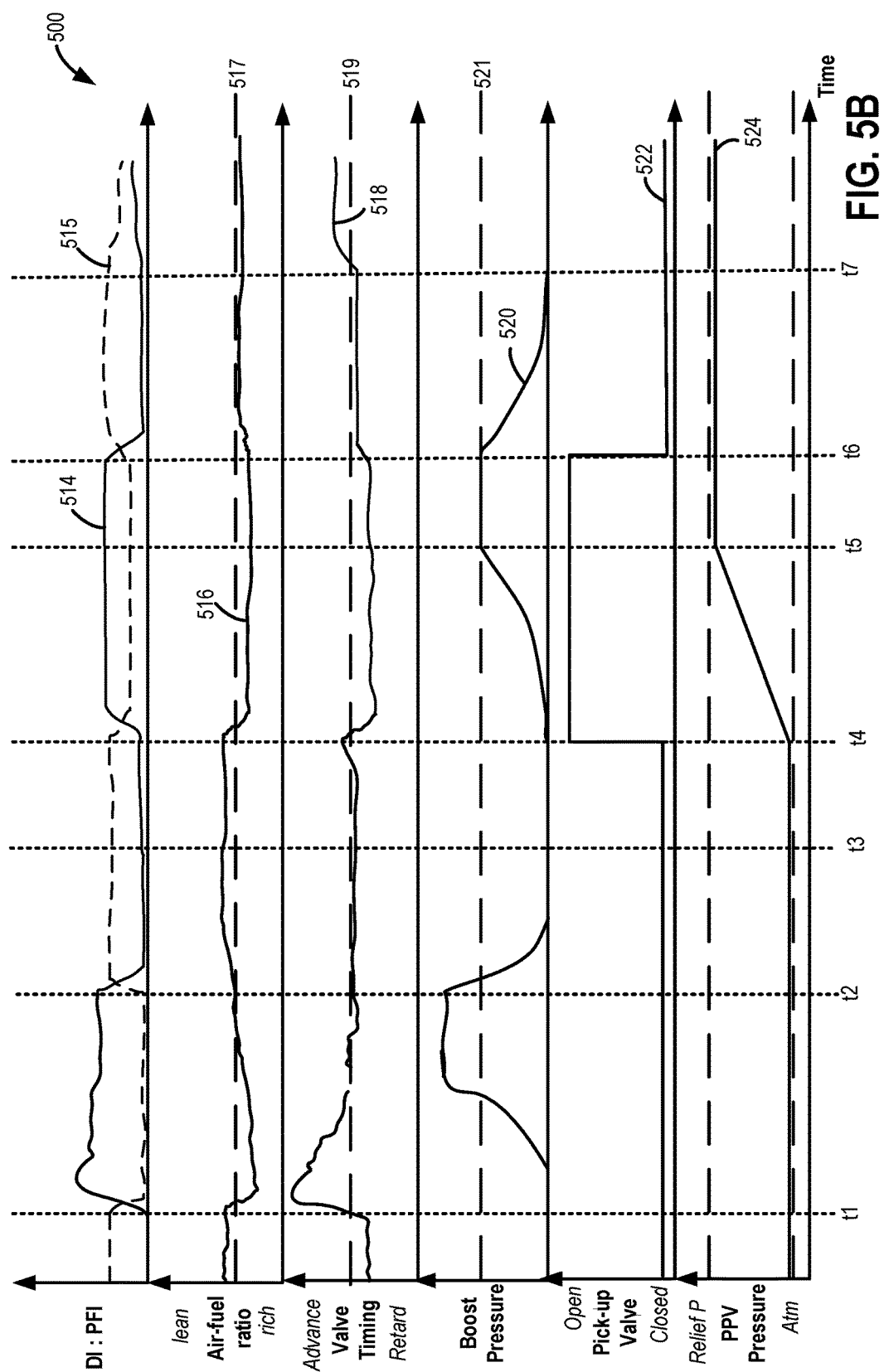

Turning now to FIGS. 4A-4B, an example routine 400 is shown for operating a compressor of a boosting device (e.g., a turbocharger) upon receiving an operator request, to provide a reliable on-board source of compressed air for filling PPV 150. It will be appreciated that the steps shown at FIGS.

4A and 4B are steps of a single routine. In one example, the method of FIGS. 4A-4B are performed as part of the routine of FIG. 3, such as at 322.

At 402, it is confirmed whether at least one of the plurality of tires of the vehicle has low tires pressure, as determined based on input from at least one tire pressure sensor. For example, low tire pressure may be confirmed if the measured tire pressure is less than the threshold tire pressure which is indicated via a TPMS alert to the operator. In one example, the TPMS alert may be shown on the display device 111. The threshold tire pressure may be determined based on functional testing for each vehicle and/or tire application, but would generally fall below 75% of normal tire pressure. In one example, where a tire has a normal inflation pressure of 250 kPA, low tire pressure nay be indicated when tire pressure decreases below 170 kPA. Low tire pressure may indicate to the operator that the tire necessitates supplemental air pressure to inflate the tire to the manufacturer-recommended air pressure. If it is determined that at least one of the tires has low tire pressure, then at 406, the method includes sending an indication to the operator to inform the operator as to which tire may be underinflated. For example, a Malfunction Indicator Lamp (MIL) may be set indicating that a tire is underinflated. In another example, an indication of low tire pressure may be sent to an operator's mobile device, wherein the vehicle controller 12 is coupled to a network, such as a cloud-based network, which is also coupled to the operator's mobile device. At 408, the method includes querying the operator if they wish to initiate a routine to fill the PPV in response to the low tire pressure indication. In one example, the operator may be asked if they wish to initiate a tire inflation routine. In one example, the operator input may be confirmed in response to the operator actuating a button on the vehicle's display or dashboard. The operator input indicates that the operator intends to initiate a PPV Fill routine. As such, this may constitute a first operator input.

If no indication of low tire pressure has been received, then at 404 the method includes determining whether an explicit operator request has been received to initiate a PPV Fill routine. The operator may desire to fill the PPV without having received an indication of low tire pressure. In other words, the operator may elect to initiate the PPV Fill mode whether or not there is an indication of low tire pressure. In one example, the operator may want to assist another driver and inflate tires on a separate vehicle. In one example, the operator input may be confirmed in response to the operator actuating a button on the vehicle's display or dashboard. The operator input indicates that the operator intends to initiate a PPV Fill routine. As such, this may constitute a first operator input.

If there was no indication of low tire pressure at 402, and the operator does request PPV filling at 404, then the method includes maintaining nominal engine operation based on operator torque demand at 405. If a first operator input (e.g., operator request) to initiate the PPV Fill function is received at 404 or 408, then the PPV Fill routine is initiated at 410.

At 410, the method includes instructing the operator to place the vehicle in condition for enabling PPV filling. This includes providing the operator with instructions on the vehicle display device 111 to park the vehicle 101, such as by displaying instructions asking the operator to set the park brake with the transmission in neutral for a vehicle equipped with a manual transmission. In addition, instructions may be displayed prompting the operator to leave the engine at idle.

At 412, the method includes confirming that the PPV fill initiating conditions have been met. For example, it may be confirmed that the vehicle 101 has been parked and the engine 10 is idling. If the vehicle is not parked or if the engine is not idling, then the routine returns to 410 to continue providing the operator with instructions to park the vehicle and leave the engine at idle. Upon confirming that the vehicle has been parked and the engine is at idle, at 414, the method includes instructing the operator to execute a plurality of steps to enable PPV filling. The controller 12 may display step-by-step instructions enabling the operator to retrieve and couple the PPV to the connection port so that the forced induction system of the engine can be operated by the controller to fill the PPV with compressed air. Instructing the operator may include, at 416, the controller displaying instructions on the display instructing the operator to retrieve the PPV from the storage region in the vehicle. In one example, where the PPV 150 is stowed in the trunk compartment 104, the controller 12 may provide instructions for locating the PPV 150 in the storage region 105 and decoupling it from the storage region (e.g., from the pocket where it is stowed). In alternate embodiments, the PPV 150 may be stored in one of a vehicle interior, an engine compartment, a storage compartment, or proximate a spare tire coupled to the vehicle. In one example, the display may generate an image of the vehicle on the screen with the PPV storage region distinguishable from other vehicle components via a label or coloring-coding. Instructing the operator may also include, at 418, the controller displaying instructions on the display instructing the operator to secure the PPV to the fill region, which may be located in the under-hood compartment such that the hood may be closed without contacting the PPV. In one example, the display may generate an image of the under-hood compartment with the PPV fill region distinguishable from other vehicle components via a label or color-coding. In another example, the controller 12 may provide instructions for locating the fill region 106 in the under-hood compartment 102 and for coupling the PPV 150 to the fill region 106.

Instructing the operator may also include, at 420, the controller 12 displaying instructions on the display instructing the operator to couple the PPV 150 to connection port 170. In one example, where the connection port includes pick-up valve 168, instructing the operator to couple the PPV to the connection port includes instructing the operator to couple the first component 166a of the pneumatic coupling 166 on the connection port 170 to the second component 166b of pneumatic coupling 166 on the free end of the pick-up line. In alternate examples, where the connection port includes one or more of a one-way check valve, a one-way valve, a regulator, and a filter, or different couplings may be used for the connection port and a tire valve stem, the intended coupling connections may be color coded and those color codes may be displayed to the operator as part of the instructions. That is to say, a corresponding color would be used to distinguish components that need to be mated. The connection port may include the second component of a high pressure pneumatic coupling wherein the first component is fixed to the free end of the pick-up line that couples the induction manifold to the PPV. However, other appropriate coupling methods may also be used. In one example, the display may generate an image of under-hood compartment that includes the PPV coupled to the fill region and the location of the connection port. Mating components may be of a distinguishable color, or a moving graphic display may be included showing how the pneumatic coupling is mated.

At 422, the method includes instructing the operator to close the hood (not shown). At 424, the method includes instructing the operator to return to the driver seat located in the passenger compartment. Output from sensors coupled to the various components employed during the PPV fill function may be used to ensure compliance with these instructions at each step. If a PPV Fill step is not completed as determined by the controller, based upon signals received from a plurality of engine sensors, the controller may not continue to offer further instructions to the operator and instead may hold the current instructions. In one example, if the controller does not receive a signal from the vehicle hood latch sensor confirming that the vehicle hood has been closed, the display may continue to display a prompt for the operator to close the hood rather than prompting the operator to return to the driver seat. If all the PPV Fill steps are completed as determined by the controller 12 based upon signals received from the plurality of engine sensors, the controller may continue to offer the subsequent instruction to the operator and proceed through routine steps. For example, at step 418, the controller 12 confirms that the PPV 150 has been secured in the fill region 106 based on input from a position sensor in the fill region, and the controller proceeds to 420. In another example, at step 420, the controller 12 confirms that the PPV 150 has been couple to the connection port 170 based on input from the pick-up valve sensor 59 coupled to the pick-up valve or pneumatic coupling, and the controller proceeds to 422. In yet another example, at 422, the controller 12 confirms the hood has been closed based on input from a sensor coupled to the hood latch, and the controller proceeds to 424. In yet another example, at 424, the controller 12 confirms that the operator returned to the driver seat based on input from an occupancy sensor coupled to the driver seat, and the controller proceeds to 426. At 426, the operator may confirm completion of all of the PPV Fill steps. If all steps are completed, the controller may proceed with filling the PPV.

At 426, the method includes receiving an operator input to confirm the completion of the PPV Fill steps in order to commence filling the PPV. As such, this constitutes a second operator input, distinct from the first operator input, and includes operator actuation of a second button on the vehicle display, distinct from the first button actuated by the operator to indicate an intent to initiate filling of the PPV. In other words, a first operator input to the controller prepares the PPV to be filled. In response to receiving the first operator input, the operator is provided with a set of instructions, such as the example set of instructions 414, to meet conditions for the engine to operate according to the PPV Fill routine. The second operator input may be solicited and received by the controller after the conditions are met for operating the engine according to the PPV Fill routine. That is to say, the operator may indicate through display device 111 or mobile device that the PPV Fill steps that were instructed have been completed. Confirmation of completion of the PPV Fill steps may be further confirmed by the controller based on signals from the sensors. In one example, a sensor located on the fill region may send a signal to the controller confirming that the PPV is properly coupled to the fill region. In other example, a sensor located on the hood latch may send a signal to the controller indicating that the vehicle hood is properly closed and latched. In a further example, an occupancy sensor located on the driver seat may send a signal to the controller ensuring that the operator has returned to the driver seat.

In response to receiving the operator input confirming completion of PPV Fill steps and a request to start filling the PPV at 426, at 432, the method includes disabling the throttle pedal and locking the transmission in park and/or locking the parking brake. This ensures that the vehicle is not propelled during execution of the PPV Fill routine. If, at 426, the operator elects not to start the PPV Fill mode, then the method may include querying the operator if they wish to abandon filling the PPV. In one example, the operator may be able to abandon the PPV Fill function at any time by selecting an exit button that is ever-present during execution of the PPV Fill routine. In other examples, the PPV Fill routine may be abandoned after a threshold time since a request to start PPV filling has elapsed, for example, after three minutes without operator input. Further, filling the PPV may be abandoned in response to an operator input indicating a desire to propel the vehicle, such as activation of a turn signal or application of an accelerator pedal, responsive to which the PPV Fill routine is disabled. If the operator elects to abandon the PPV Fill mode, then at 430 the method includes instructing the operator to decouple the PPV 150 from the connection port 170 and return it the storage region 105 and the routine 400 is disabled. For example, the method may include the controller 12 displaying instructions on the display device 111 instructing the operator to decouple the PPV 150 from connection port 170. In one example, instructing the operator to decouple the PPV from the connection port 170 includes instructing the operator to decouple the first component 166a of the pneumatic coupling 166 on the connection port 170 from the second component 166b of pneumatic coupling 166 on the free end of the pick-up line. In a further example, at 430, the method may include the controller 12 instructing the operator, via display device 111, to return the PPV to the storage region 105 in the trunk compartment 104. In one example, the display device 111 may generate an image of the vehicle 101 on the screen with the PPV storage region distinguishable from other vehicle components via a label or coloring-coding. In another example, the controller 12 may confirm that the PPV 150 has been decoupled from the connection port 170 and returned to the storage region 105 using signals from engine sensors before disabling routine 400.

Continuing on to FIG. 4B, upon confirming that PPF fill conditions are met, at 434, the method includes opening the pick-up valve 168 to fluidically couple the induction passage 43 to the portable pressure vessel. For example, the controller may send a signal to a pick-up valve actuator to move the valve to a fully open position. Prior to step 435, the engine may be operating without boost and so a negligible amount of air may flow between the induction passage 43 and the PPV 150. In addition, the pick-up valve 168 may be configured as a one-way valve (e.g. check valve) to reduce back-flow when pressure in the induction manifold is not sufficiently higher than in the PPV.

At 436, the method includes increasing boost pressure in the induction system to a threshold boost pressure by adjusting a primary set of engine parameters. The level of boost pressure in the induction system may be determined based on the output of a MAP sensor coupled to the induction passage. Adjusting of a plurality of primary engine parameters may include adjusting one or more of the vehicle auxiliary systems, engine speed, throttle, waste-gate valve, and compressor recirculation valve (CRV). Camshaft positioning and valve timing may also be adjusted.

As one example, adjusting the primary set of engine parameters includes adjusting at least one vehicle auxiliary system (e.g., alternator, a/c compressor, integrated start-generator (ISG) on a hybrid electric vehicle, etc.) to increaser the auxiliary load applied on the engine 10. At least one of the plurality of auxiliary systems may be activated to generate a load on the engine allowing the engine to generate increased boost. The controller may send a signal to turn on at least one primary vehicle auxiliary system automatically during the PPV Fill routine, without receiving any operator input or request to operate the auxiliary system, and without delivering any torque to the vehicle drivetrain. In one example, the vehicle may be at an engine idle condition, with the battery fully charged and air conditioning off when the PPV Fill routine is initiated at 436. In one example, the controller 12 may selectively activate the alternator to increase the auxiliary load on the engine 10 and increase boost pressure within the forced induction system of the engine 10 without a need to operate the alternator due to low battery charge. In another example, the controller 12 may selectively activate an air conditioning system compressor to increase the auxiliary load on the engine 10 and increase boost pressure within the forced induction system of the engine 10 without receiving an operator demand for air conditioning. In one example, the degree of increase in auxiliary loads the controller 12 places on the engine 10 may be based on predetermined settings. In other examples, the degree of increase in auxiliary loads on the engine 10 may be determined based upon ambient conditions or how quickly the operator desires to fill the PPV 150. In will be appreciated that in some examples, all auxiliary systems may be operated, while in other examples, select auxiliary systems may be operated to achieve the desired boost. For example, when ambient humidity and pressure are high, the A/C compressor duty cycle may be increased, while when ambient humidity and pressure low, all auxiliary system loads may be increased.

During regular operating conditions (e.g., not PPV Fill mode), auxiliary systems may be controlled to provide set outputs of alternator current, coolant flow, and refrigerant flow as a function of varying engine operation modes and environmental conditions. During PPV filling, the same control of auxiliary systems may be maintained, with each of the subsystems' regulation methods further controlled to compensate for the increased engine speed (e.g., RPM) incurred during PPV filling. Hydraulic power steering may remain unused during PPV filling. In one example, alternator charging current would be controlled electronically, the current increased as engine speed increases. In another example, the A/C compressor duty cycle may be adjusted for the temporary increase in engine speed, the duty cycle increased as the engine speed increases. As a further example, a mechanical water pump function would follow engine speed (e.g., as engine speed increases, water pump output increases) as the thermostat operates based on coolant temperature regardless of other engine operating conditions. In yet another example, mechanical cooling fans may follow engine speed or decouple from the engine as needed to meet cooling requirements, using an existing clutch mechanism.

As another example, adjusting the primary set of engine parameters includes increasing an engine speed to maintain operating conditions to sustain the increased engine load invoked by the vehicle auxiliary systems. That is to say, the controller may send a signal to a plurality of actuators to increase the speed of engine rotation. As stated previously, during the PPV fill mode, the operator's throttle pedal may be disengaged so engine speed during the PPV Fill mode is controlled exclusively by the controller. In one example, the intake throttle may be partially closed to increase boost pressure in the induction passage or it may be opened to accommodate an increased engine load and engine speed. That is to say, the controller may send a signal to an actuator of the intake throttle to move the intake throttle to a partially closed position. It will be appreciated that the intake throttle may be fully closed when the engine is shutdown. If the engine is idling, for example prior to the start of the PPV Fill routine, the intake throttle may be almost fully closed but opened just enough to allow the engine to idle. Alternatively, if the engine includes an idle control valve to bypass the intake throttle, when the engine is idling, the intake throttle may be fully closed while the idle control valve is opened to enable the engine to idle and avoid engine stall. Then, in response to PPV filling, the opening of the throttle 20 may be decreased below a nominal engine idle condition to increase boost pressure in the induction passage.

By increasing the engine speed under specified conditions, the engine 10 may be able to generate more exhaust flow which in turn increases the speed of the turbine 116, further increasing the speed of the compressor 110, which further increases the boost in the induction passage 43 and the available compressed air flow to the PPV 150. In one example, the throttle opening may be decreased and/or engine speed may be increased to predetermined levels to achieve the desired boost, while in other examples, the throttle opening and/or engine speed may be gradually adjusted to achieve the desired boost. In one example, gradually decreasing the throttle opening and/or increasing the engine speed to achieve the desired boost may be dependent upon ambient conditions (ambient temperature, pressure, humidity), engine temperature, manifold air pressure (MAP), and/or manifold air flow (MAF).

As another example, adjusting the primary set of engine parameters includes closing the waste-gate across the turbine to increase the flow of exhaust gas from the engine through the turbine. Specifically, the controller 12 may send a signal to an actuator of the waste-gate valve 92 to move the waste-gate valve to a more closed (e.g., fully closed) position. The increased flow across the turbine 116 increases turbine speed, increasing the speed of the compressor 110, thereby generating increased boost pressure in the induction passage 43.

As another example, adjusting the primary set of engine parameters includes adjusting the camshaft positioning which adjusts valve timing. Specifically, the controller 12 may send a signal to an actuator of the camshaft to move the camshaft to a position that retards the timing of valve operation during PPV Fill mode. That is to say, the intake and exhaust valves may be retarded so they open and close later (e.g., after TDC) to decrease the amount of compressed air entering the engine cylinders. In another example, the controller may send a signal to the actuator of the camshaft to advance the intake and exhaust valves so they open and close sooner (e.g., before TDC) to accommodate the increased engine speed associated with engine operation in the PPV Fill mode). In some examples, the engine may include distinct camshafts for controlling intake valves and for controlling exhaust valves. In other examples, the engine may have camshafts for each bank of cylinders in the engine. In yet another example, by advancing the exhaust valves during PPV Fill mode, an increased exhaust flow may spin the turbine more quickly. By actively adjusting the intake and exhaust valves during PPV Fill mode as described above, the engine may be operated at an increased speed to generator boost pressure without detonation. In one example, the camshaft positioning and valve timing may be adjusted to predetermined timings to achieve the desired boost, while in other examples, the camshaft positioning and valve timing may be gradually adjusted to achieve the desired boost.

At 437, the method may include adjusting a secondary set of engine parameters to allow the engine to operate without detonation while boost in increased during engine idling. Detonation is an erratic form of combustion, wherein excess pressure and heat in a combustion chamber cause the air/fuel mixture to ignite prior to spark application. The plurality of engine sensors may monitor engine parameters and the controller may adjust the secondary set of engine parameters using a secondary set of actuators to achieve the desired, increased boost without detonation occurring. The secondary engine parameters may include an air-fuel ratio, a spark timing, adjusting the proportion of direct injection to port injection, and adjusting the operation of at least one secondary auxiliary system. Examples of secondary auxiliary systems may include a water pump, and a radiator fan.

As one example, adjusting the secondary set of engine parameters includes adjusting the air-fuel ratio. The air-fuel ratio is the mass ratio of air to fuel during combustion. A ratio wherein exactly enough air is provided to completely combust all the fuel is considered a stoichiometric air-fuel ratio. If the air-fuel ratio is higher than stoichiometric it is considered "lean," and there is excess air after complete combustion of all the fuel. Lean fuel mixtures are more prone to detonation, and so decreasing the air-fuel ratio by increasing the fuel toward a more "rich" mixture may decrease the likelihood of detonation.

As another example, adjusting the secondary set of engine parameters includes adjusting the spark timing. In one example, the spark timing may be retarded to avoid detonation. Spark may be adjusted to occur slightly after top dead center (TDC). In one example, the spark timing and air-fuel ratio may be adjusted to predetermined levels to achieve the desired boost, while in other examples, the spark timing and air-fuel ratio may be gradually adjusted to achieve the desired boost.

As another example, adjusting the secondary set of engine parameters includes adjusting the proportion of fuel delivered as direct injection (DI) relative to port fuel injection (PFI), also known as the fuel split ratio. For example, control methods including DI/PFI split may need to be utilized to prevent detonation as during other engine operating modes. In other words, a given amount of fuel may be delivered with a higher proportion of DI relative to PFI. While port injection tends to warm the air-fuel mixture prior to entering the combustion chamber, direct injection offers a cooling effect as cool fuel is delivered directly to the combustion chamber. By adjusting the fuel split ratio to increase the proportion of DI, the combustion temperature is reduced, so that increased boost may be generated by the engine 10 during the idle condition with reduced likelihood of detonation. Other example control methods may include: depending on the nominal engine fuel injection strategy, the DI ratio may be increased, the air/fuel ratio may be more rich, and spark timing may be retarded to decrease the likelihood of detonation during PPV filling. The increase of engine speed to increase boost pressure during PPV filling would also reduce the likelihood of detonation occurring.

As another example, adjusting the secondary set of engine parameters may include selectively operating a cooling water pump and radiator fan to increase the cooling effects of the cooling system (not shown) on the engine. This helps to effectively manage an elevated boost condition at idle without detonation, when the typical cooling effects of wind (generated during vehicle travel) are not available. It will be appreciated that the selective and automated operation of the water pump and radiator fan may be performed as part of the PPV Fill routine (e.g., in response to an increase in engine temperature as a result of increased engine speed), and not responsive to an operator request or input.

It will be appreciated that during step 435 of the PPV Fill mode, as the boost pressure increases in the induction manifold, the air pressure in the PPV also increases as the two volumes are fluidically coupled via the open pick-up valve of the connection port.

At 438, the method includes determining whether the boost pressure in the induction manifold has reached a threshold boost pressure. The air pressure in the induction manifold may be determined using a MAP sensor. The manifold air pressure sensor may determine the boost pressure within the induction manifold and the controller may compare it to the threshold boost pressure. The threshold boost pressure may be determined based on an air pressure required to inflate a tire as recommended by the manufacturer, based on limitations of available boost pressure, or based on mechanical limitations of the engine components. If, at 438, the threshold boost pressure has not been reached, then at 440, the method includes continuing to operate the engine in the PPV Fill mode with the turbocharger compressor being operated at engine idling to fill the PPV. The MAP sensor continuously monitors the air pressure in the induction manifold. If the threshold boost pressure has been reached, then at 442, the method includes starting a timer to perform a time count. The time count may allow sufficient time to elapse after the threshold boost pressure is reached to ensure the PPV is filled to capacity. At 444, the method includes determining whether the time count has reached a predetermined threshold count. If the time count has reached the threshold count, then at 446, the method includes closing the pick-up valve by sending a control signal to the valve. By closing the pick-up valve, the PPV and the induction manifold are fluidically decoupled. The PPV may be equipped with a relief valve that may be set to open at or slightly above the threshold boost pressure. The relief valve offers a simple and effective method for preventing excessive pressurization of the PPV. After the pick-up valve is closed, at 448, the method includes resuming nominal engine operation based on operator torque demand and engine operating conditions. At 449, the method includes providing an indication to the operator that the PPV is pressurized and the fill routine is complete. Providing the indication to the operator that the PPV is pressurized may include displaying a message on the display screen of a user interface inside the vehicle or generating an indication on the operator's mobile device.

At 450, the routine includes instructing the operator to execute a final set of steps to conclude PPV filling. Instructing the operator may include, at 451, instructing the operator to open the hood of the vehicle to access the under-hood compartment. Instructing the operator may include, at 452, instructing the operator disconnecting the PPV from the connection port. In one example, this may include displaying an image and instructions on the display device indicating how to decouple the first and second components of the pneumatic coupling. The image on the display device may include labels and/or color-coding to distinguish the components to decouple. Instructing the operator may also include, at 454, instructing the operator to remove the PPV from the fill station. In one example, the display device may generate an image of the under-hood compartment of the vehicle on the screen with the PPV fill region distinguishable from other vehicle components via a label or coloring-coding. Instructing the operator may include, at 456, instructing the operator to couple the PPV to the tire and inflate as needed. In one example, the display device may include an image of a vehicle tire and the PPV that includes an automated graphic or a color-coded and/or labeled image describing how to couple the PPV to the tire valve stem and deliver compressed air from the PPV to the tire, thereby inflating the tire. Instructing the operator may also include, at 458, instructing the operator to stow the PPV in its designated storage region. In the depicted example, the designated storage region is located in the vehicle trunk compartment. However, it will be appreciated that the storage region may be located in the passenger compartment, the under-hood compartment, or proximate a spare tire on the vehicle.

In this way, an existing forced induction system may be advantageously used as a source of compressed air for inflating tires. Responsive to a first operator input, the controller provides operator instructions via a display device to set up a portable pressure vessel for filling which includes the operator coupling the portable pressure vessel to a connection port included on the induction passage. Responsive to a second operator input, the controller sends a signal to selectively open a pick-up valve in the connection port to fluidically couple the portable pressure vessel and the induction passage, and actuates a plurality of engine system actuators to boost air pressure in the induction passage so as to fill the portable pressure vessel. After a threshold boost pressure is achieved and maintained for a predetermined duration, the controller sends a signal to close the pick-up valve, fluidically decoupling the induction passage and the portable pressure vessel. The controller then sends the operator instructions to use the compressed air from the PPV to inflate an underinflated tire.

Turning now to FIGS. 5A-5B, an example timeline of operation of a turbocharger for boost control as well as for on-board generation of compressed air is shown at example map 500. The horizontal (x-axis) denotes time and the vertical markers t1-t7 identify significant times for turbocharger operation. In reference to FIG. 5A, plot 502 shows variation in an accelerator pedal position over time. Plot 504 shows variation in engine speed over time. Plot 506 shows variation of a throttle opening over time. Plot 508 shows changes in the position of a waste-gate valve coupled across an exhaust turbine of a turbocharger. Plot 510 shows variation of a turbocharger compressor speed. Turning now to FIG. 5B, plot 514 shows the ratio of direct injected fuel (solid line 514) and port injected fuel (dashed line 515) over time. Plot 516 shows the change in air-fuel ratio over time relative to a stoichiometric ratio 515. Plot 518 shows changes in valve timing over time where plot 519 is nominal valve timing. Plot 520 shows changes in the boost pressure over time where plot 521 is a threshold boost pressure. Plot 522 shows changes in the opening position of a pick-up valve coupling the induction passage to a pressurized air pick-up line. When the pick-up valve is opened, air flows from the induction passage into the air pick-up line and into the portable pressure vessel. Plot 524 shows changes in air pressure inside the portable pressure vessel as a result of PPV filling. The pick-up valve is located downstream of the compressor and upstream of the throttle in the induction passage.

Prior to time t1, the engine is operating without boost (plot 520) due to a lower driver demand (plot 502). At this time, the engine speed (plot 504) is in a low speed region (e.g., just above idling) and the intake throttle (plot 506) is open by a small amount to provide the desired engine speed-load profile. An exhaust waste-gate valve (plot 508) is maintained open since boost is not demanded, and therefore the turbocharger compressor is not spinning (plot 510). At a low torque demand, such as the low torque demand prior to t1, the engine is operated with a higher ratio of port fuel injection (plot 515) to direct fuel injection (plot 514). The air-fuel ratio is slightly lean, due to low engine load as shown by plot 516. The valve timing is slightly retarded due to low engine load (plot 518). The pick-up valve is closed (plot 522) since the PPV filling has not been requested by the operator. The PPV is depressurized and stowed, and therefore the PPV pressure is zero (plot 524).

At time t1, the operator tips in (plot 502), moving the engine from engine operation with natural aspiration to engine operation with boost. In response to the tip-in, throttle opening (plot 506) is increased to meet the increased air flow demand. In response to increased air flow, fuel usage is also increased. To meet the increased torque demand, at the higher speed load region, the fuel may be delivered at a higher DI to PFI ratio (plots 514, 515). The increased air flow and corresponding fuel usage results in an increase in engine speed (plot 504). Also, responsive to the tip-in, waste-gate valve opening is reduced (plot 508) to flow more exhaust through the turbocharger turbine, expediting turbine spin-up, and increasing compressor speed (plot 510). As a result, boost pressure starts to increase (plot 520). At tip-in, the valve timing (plot 518) may be advanced to increase intake air flow to the cylinders. Since no PPV filling is requested, the pick-up valve remains closed (plot 522) and the pressure in the PPV remains at atmospheric conditions (plot 524). Between t1 and t2, intake air compressed by the compressor is delivered to the engine to meet the boost demand, responsive to the increased operator torque demand.

It will be appreciated that between t1 and t2, when boost pressure is delivered via the turbocharger compressor, the pick-up valve is held closed so as to prevent leakage of boost pressure from the induction passage into a pressurized air pick-up line. Also, since the PPV remains stowed and decoupled from the induction passage, pressure in the PPV remains atmospheric.

At t2, there is a drop in driver torque demand, such as due to a tip out. Responsive to the drop the driver torque demand, the throttle opening is reduced, and the engine speed reduces to an idling speed. To reduce boost pressure, the waste-gate valve is fully opened to increase the flow of exhaust bypassing the exhaust turbine. Responsive to decreasing the exhaust flow through the turbine, the turbine speed spins down thereby also decelerating the turbocharger compressor and decreasing the boost pressure in the induction passage. Responsive to the drop in driver torque demand, the ratio of PFI to DI increases, and the air-fuel ratio moves toward a leaner ratio. Also responsive to the drop in driver torque demand, the valve timing may also move toward a more retarded condition. Since no PPV filling is requested, the pick-up valve remains closed and the pressure in the PPV remains at atmospheric conditions.

At t3, the operator provides a first operator input to the controller to initiate filling the PPV. In one example, the operator may have received a low tire pressure indication from the controller and has confirmed the desire to fill the PPV. In another example, the operator may have explicitly requested the PPV operation to fill the PPV to assist another driver with inflating a tire. Between t3 and t4, the vehicle comes to a stop with the engine at idle. In one example, the operator may have parked the vehicle at an idle in response to a controller prompt to do so. Also, the operator may be provided with an initial set of instructions through the display device to prepare the PPV for filling. As discussed previously, the initial set of instructions may include retrieving the PPV from the storage region, coupling the PPV to the fill station in the under-hood compartment, coupling the PPV to the connection port on the induction passage, closing the vehicle hood, and returning to the driver seat. Conditions are considered met for increasing boost pressure within the forced induction system to fill the PPV.

At t4, the operator provides the controller a second operator input indicating their intent to commence PPV filling. That is to say, the operator confirms that the initial instructions to prepare the PPV for filling have been completed, and the operator elects to begin filling the PPV through a vehicle user interface, and the conditions for PPV filling are considered met. That is to say, the vehicle is parked and the engine is at idle, and the vehicle's automatic transmission is in a "park" position, or in a manual transmission embodiment, in neutral with the emergency brake applied. Additionally, the PPV has been secured in the fill region and coupled to the connection port, the hood has been closed, and the operator has returned to the driver seat. In one example, prior to opening the pick-up valve, the controller may disable the operator throttle pedal and lock the transmission gear position to prevent the vehicle being propelled during PPV filling.

At t4, the pick-up valve is opened (plot 522), fluidically coupling the PPV to the induction passage. Because the vehicle is at idle, and the operator throttle pedal is disabled by the controller during the PPV Fill operation, the pedal position remains undepressed as shown in plot 502. Between t4 and t5, boost pressure within the induction passage is increased by adjusting one or more engine actuators even though the engine is at idle. Adjusting one or more engine actuators may include activating one or more engine auxiliary systems to increase the load on the engine, further increasing the engine's ability to increase boost. At t4, the throttle opening is decreased to partially restrict intake air from entering the engine, while the engine speed is increased as shown in plot 504. The waste-gate valve may be closed at t4 as shown by plot 508. This increases the spin of the turbocharger compressor as shown by plot 510. As the turbocharger spins up, the valve timing may be adjusted (plot 518) to accommodate the increased engine speed and to ensure air charge in the cylinders is appropriate for the increased operating speed and engine load. In the depicted example, valve timing is retarded below a nominal valve timing for nominal engine idle conditions. Retarding the valve timing during PPV Fill mode may decrease the air flow to the engine cylinders, thereby increasing the boost pressure in the induction passage. In another examples, the valve timing may be advanced during PPV Fill mode to meet the desired boost levels and engine operating conditions. In the PPV filling condition, adjustment the waste-gate valve may be adjusted to ensure an appropriate amount of exhaust gas passes through the turbine, which turns the compressor to provide increased boost pressure to the induction passage. As previously mentioned, during PPV filling, the throttle plate and valve timing may be adjusted to retain the majority of the increased boost pressure in the induction passage and not in the engine cylinders. In one example, the opening of the throttle plate may be decreased in order to decrease the amount of compressed intake air entering the engine cylinders. It will be appreciated that the waste-gate valve, valve timing, and throttle plate may be actively controlled during PPV Fill mode to meet the desired equilibrium target levels of boost pressure and engine speed. The air-fuel ratio may be shifted toward a more rich mixture to decrease the likelihood of detonation, and the ratio of DI to PFI may increase. In one example, there may be a greater portion of DI than PFI between t4 and t5 in order to decrease the temperature of the combustion chamber. The boost pressure (plot 520) is increased and approaches a threshold boost pressure 519. At t4, because the pick-up valve is open, the PPV and induction passage are fluidically coupled, therefore the pressure in the PPV (plot 524) begins to increase with the increase in boost pressure.

At time t5, the boost pressure (plot 520) has reached the threshold boost pressure 519 and a timer is started. Between t5 and t6 operating conditions are maintained to supply boost pressure for a duration. This allows sufficient time for the PPV to fill and the pressure therein to stabilize, and a relief valve may be set to the threshold boost pressure to allow excess pressure to vent to atmosphere. Optionally, between t5 and t6, the controller may give instruction to the operator about how to use the PPV to inflate a tire. The time elapsed between t5 and t6 is the temporary duration at which the boost pressure of the forced induction system is maintained at the threshold boost pressure.

The time count reaches its threshold time count at time t6, at which time the pick-up valve is closed and the engine is returned to an idling condition. At t6, the boost pressure in the forced induction system decays as the engine is returned to an idling condition. After t6, the engine is operated based on operator torque demand until t7, when the operator requests a gradual acceleration as indicated by actuation of the pedal position. Responsive to the increase in torque demand generated by actuation the accelerator pedal, the throttle opening is increased to increase air flow to the engine. Responsive to an increase in air flow, engine speed increases and the waste-gate valve opening may be decreased. In one example, the waste-gate valve may be fully closed. Closing of the waste-gate valve increases exhaust gas flow through the exhaust turbine, increasing its speed, thereby increasing the speed of the turbocharger compressor and the boost pressure generated by the engine. Responsive to an increased operator torque demand, nominal valve timing may be resumed.

In this way, an existing forced induction system may be advantageously used as an emergency source of compressed air for inflating tires. By reducing the need for a dedicated air pump and reservoir system, significant cost reduction and component reduction benefits can be achieved while providing a simple, low-cost, and reliable solution for inflating tires in an emergency. The portable pressure vessel may be configured to be small enough to be easily depressurized and conveniently stowed during non-use. By ensuring its depressurization during stow, the pressure vessel is rendered inert. By operating the fill function during an engine idle condition, vehicle performance is not affected during filling of the PPV using the forced induction system.

An example vehicle system comprises an engine; a forced induction system coupled to an intake passage of the engine; a drivetrain with a tire; and a portable pressure vessel releasably coupleable to the forced induction system via a connection port, and further releasably coupleable to the tire. In the preceding example, the system additionally or optionally further comprises a controller storing instructions in memory, executable to: receive an operator request to fill the portable pressure vessel; and responsive to the operator request, displaying instructions enabling the operator to transfer the portable pressure vessel from a storage region to a fill region of the vehicle system and couple the pressure vessel to the connection port; and responsive to operator input indicating completion of the of instructions, initiating vessel filling via the forced induction system. In any or all of the preceding examples, additionally or optionally, the forced induction system comprises at least one of a turbocharger and a supercharger. In any or all of the preceding examples, additionally or optionally, the connection port includes one or more of a pneumatic coupling, a regulator, a filter, a sensor, and a pick-up valve comprising a check-valve. In any or all of the preceding examples, additionally or optionally, the portable pressure vessel includes a pressure relief valve. In any or all of the preceding examples, additionally or optionally, the storage region includes a first pocket shaped to receive and hold the portable pressure vessel, the storage region positioned entirely within one of a passenger compartment, an under-hood compartment, a trunk compartment, and proximate a spare tire stored in the vehicle system. In any or all of the preceding examples, additionally or optionally, the fill region includes a second pocket shaped to receive and hold the portable pressure vessel, the fill region positioned entirely within the under-hood compartment and positioned such that when the portable pressure vessel is coupled to the fill region, a vehicle hood may be closed. In any or all of the preceding examples, additionally or optionally, initiating portable pressure vessel filling via the forced induction system includes adjusting one or more engine actuators to raise boost pressure within the forced induction system to a greater extent than without receiving the operator request, under current vehicle operating conditions.

An example method of filling a portable pressure vessel comprises: responsive to receiving an operator request during a vehicle idle condition, increasing a boost pressure within a forced induction system; and directing compressed air flow to the portable pressure vessel through an open pick-up valve in the forced induction system. In the preceding example, additionally or optionally, increasing the boost pressure comprises increasing an auxiliary load on the engine by activating a vehicle auxiliary system independent of an operator demand for HVAC operation, or a vehicle demand for charging a battery. In any or all of the preceding examples, additionally or optionally, the vehicle auxiliary system comprises one or more of an alternator, an integrated starter-generator included on a hybrid electric vehicle, an A/C compressor, and a water pump. In any or all of the preceding examples, additionally or optionally, increasing the boost pressure includes one or more of closing an exhaust waste-gate valve coupled to a turbine of the forced induction system, adjusting an intake throttle, closing a compressor recirculation valve coupled to a compressor of the forced induction system, retarding ignition timing, retarding camshaft timing, and adjusting fuel injection. In any or all of the preceding examples, additionally or optionally, the operator request does not include any of an operator steering input, an operator pedal input, and an operator transmission lever input. In any or all of the preceding examples, additionally or optionally, the method further comprises continuing operation with the increased boost pressure for a duration, closing the pick-up valve, reducing the boost pressure, and then generating an indication to the operator of portable pressure vessel filling completion. In any or all of the preceding examples, additionally or optionally, the method further comprises generating a low tire pressure warning and subsequent to the generation of the warning, generating a prompt to request whether filling the portable pressure vessel is desired. In any or all of the preceding examples, additionally or optionally, the low tire pressure warning is displayed to the operator via one or more of the following: a graphic user interface in a passenger compartment or a mobile device via a cloud.

Another example method of filling a portable pressure vessel comprises: responsive to detecting a low tire pressure, displaying a low tire pressure indication to an operator and suggesting filling a portable pressure vessel; responsive to receiving a first operator input requesting portable pressure vessel fill, displaying an instruction set which includes coupling the portable pressure vessel to a connection port on an induction passage, the passage coupled between a compressor and an engine cylinder; responsive to receiving a signal set detecting completion of the instruction set, prompting the operator to start the portable pressure vessel fill; receiving a signal indicating a vehicle hood is closed; and responsive to receiving a second operator input confirming to start filling the portable pressure vessel, adjusting engine operation to increase boost pressure for a temporary duration while the vehicle hood remains closed. In the preceding example, additionally or optionally, the instruction set further includes parking the vehicle, maintaining an engine idle condition, securing the portable pressure vessel in a fill region, coupling the portable pressure vessel to the connection port, closing the vehicle hood, and instructing the operator to return to the driver seat. In any or all of the preceding examples, additionally or optionally, receiving a signal set detecting completion of the instruction set includes receiving signals from a plurality of vehicle sensors including one or more of a pedal position sensor, a transmission position sensor, a pick-up valve sensor, a hood latch sensor, and an occupancy sensor. In any or all of the preceding examples, additionally or optionally, adjusting engine operation comprises adjusting one or more actuators, the actuators controlling a waste-gate valve coupled to a turbine of the forced induction system, a compressor recirculation valve coupled to a compressor of the forced induction system, an intake throttle coupled to the induction passage, downstream of the compressor of the forced induction system, ignition timing, camshaft timing, auxiliary loads, and fuel injection.

In a further representation, a method for a boosted engine of a vehicle, comprises: during a first engine idling condition, operating the engine with an exhaust waste-gate valve open, an intake throttle less open, and with an intake manifold at barometric pressure; and during a second engine idling condition, operating the engine with the exhaust waste-gate valve closed, an intake throttle more open, and with the intake manifold above barometric pressure. In the preceding example, the method additionally or optionally includes during the first condition, a vehicle tire pressure is above a threshold, and during the second condition, the vehicle tire pressure is below the threshold. In any or all of the preceding examples, additionally or optionally, the method includes during the first condition, an operator has not requested filling of a portable pressure vessel stowed on-board the vehicle, and wherein during the second condition, the operator has requested filling of the portable pressure vessel. In any or all of the preceding examples, additionally or optionally, the method includes during both the first and second condition, operator torque demand is less than a threshold. In any or all of the preceding examples, additionally or optionally, the method further comprises, during the first condition, operating the engine with a lower than threshold auxiliary load, and during the second condition, operating the engine with a higher than threshold auxiliary load, and wherein during both the first and second condition, operator auxiliary load demand is less than a threshold. In any or all of the preceding examples, additionally or optionally, the method further comprises, during the first condition, actuating a variable cam timing device to retard intake and exhaust valve timing, and during the second condition, actuating a variable cam timing device to advance intake and exhaust valve timing. In any or all of the preceding examples, additionally or optionally, further comprises, during the second condition, raising a boost pressure in the intake manifold to a threshold boost pressure, the threshold boost pressure based on a vehicle tire pressure. In any or all of the preceding examples, additionally or optionally, raising the boost pressure includes compressing air via an intake compressor driven by an exhaust turbine coupled to the exhaust waste-gate valve. In any or all of the preceding examples, additionally or optionally, the method further comprises, during the second condition, drawing compressed air from downstream of the compressor and upstream of the throttle into the portable pressure vessel. In any or all of the preceding examples, additionally or optionally, the method comprises during a first condition, operating with a higher ratio of fuel delivered via port injection relative to direct injection, and during the second condition, operating with a higher ratio of fuel delivered via direct injection relative to port injection.

In a further representation, a method for a vehicle comprises: responsive to vehicle tire refilling conditions being met while a vehicle engine is idling, displaying, to a vehicle operator, instructions for retrieving a portable pressure vessel stowed in a vehicle trunk compartment and coupling the vessel to an engine induction passage in a vehicle underhood compartment; and responsive to the instructions being performed, increasing boost pressure in the idling engine to fill the vessel. In the preceding example, the vehicle tire refilling conditions being met, additionally or optionally, includes one of an operator request for refilling the vehicle tire, and output of a vehicle tire pressure sensor being lower than a threshold pressure. In any or all of the preceding examples, additionally or optionally, the vehicle engine is idling includes operator torque demand and auxiliary load demand being lower than a threshold. In any or all of the preceding examples, additionally or optionally, increasing boost pressure includes one or more of closing an exhaust waste-gate valve coupled across a turbine of a forced induction system, increasing an opening of an intake throttle, increasing an auxiliary load applied on the engine, and retarding ignition timing.

In a further representation, a method for a vehicle comprises: during a first condition, operating a turbocharger to raise boost pressure responsive to an increase in operator torque demand; and during a second condition, operating the turbocharger to raise boost pressure responsive to a decrease in vehicle tire pressure, and independent of a decrease in operator torque demand. In the preceding example, additionally or optionally, the method includes during the first condition, flowing air compressed by the turbocharger to engine cylinders via an intake throttle; and during the second condition, flowing air compressed by the turbocharger to a portable pressure vessel coupled downstream of the compressor and upstream of the intake throttle. In any or all of the preceding examples, additionally or optionally, the method includes during the second condition, a greater amount of compressed air flows to the PPV than to the engine cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   an engine;
   a forced induction system coupled to an intake passage of the engine;
   a drivetrain with a tire;
   a portable pressure vessel releasably coupleable to the forced induction system via a connection port, and further releasably coupleable to the tire; and
   a display device presenting instructions to execute a series of steps to prepare the portable pressure vessel for filling.

2. The vehicle system of claim 1, further comprising:
   a controller storing instructions in memory, executable to:
      receive an operator request to fill the portable pressure vessel;
      where the display device presents the instructions responsive to receiving the operator request and where the instructions include a series of steps enabling the operator to transfer the portable pressure vessel from a storage region to a fill region of the vehicle system and couple the portable pressure vessel to the connection port; and
      responsive to an operator input indicating completion of the instructions,
         initiating filling of the portable pressure vessel via the forced induction system.

3. The vehicle system of claim 1, wherein the forced induction system comprises at least one of a turbocharger and a supercharger.

4. The vehicle system of claim 1, wherein the connection port includes one or more of a pneumatic coupling, a regulator, a filter, a sensor, and a pick-up valve comprising a check-valve.

5. The vehicle system of claim 1, wherein the portable pressure vessel includes a pressure relief valve.

6. The vehicle system of claim 2, wherein the storage region includes a first pocket shaped to receive and hold the portable pressure vessel, the storage region positioned entirely within one of a passenger compartment, an under-hood compartment, a trunk compartment, and proximate a spare tire stored in the vehicle system.

7. The vehicle system of claim 6, wherein the fill region includes a second pocket shaped to receive and hold the portable pressure vessel, the fill region positioned entirely within the under-hood compartment and positioned such that when the portable pressure vessel is coupled to the fill region, a vehicle hood may be closed.

8. The vehicle system of claim 2, wherein initiating filling of the portable pressure vessel via the forced induction system includes adjusting one or more engine actuators to raise boost pressure within the forced induction system to a greater extent than without receiving the operator request, under current vehicle operating conditions.

9. A method of filling a portable pressure vessel, comprising:
responsive to receiving an operator request during a vehicle idle condition,
increasing a boost pressure within a forced induction system; and
directing compressed air flow to the portable pressure vessel through an open pick-up valve in the forced induction system;
wherein the operator request does not include any of an operator steering input, an operator pedal input, and an operator transmission lever input.

10. The method of claim 9, wherein increasing the boost pressure includes increasing an auxiliary load on an engine by activating a vehicle auxiliary system independent of an operator demand for HVAC operation, or a vehicle demand for charging a battery.

11. The method of claim 10, wherein the vehicle auxiliary system comprises one or more of an alternator, an integrated starter-generator included on a hybrid electric vehicle, an A/C compressor, and a water pump.

12. The method of claim 9, wherein increasing the boost pressure includes one or more of closing an exhaust waste-gate valve coupled to a turbine of the forced induction system, adjusting an intake throttle, closing a compressor recirculation valve coupled to a compressor of the forced induction system, retarding ignition timing, retarding camshaft timing, and adjusting fuel injection.

13. The method of claim 9, further comprising continuing operation with the increased boost pressure for a duration, closing the pick-up valve, then generating an indication to the operator of portable pressure vessel filling completion, and reducing the boost pressure.

14. The method of claim 9, further comprising generating a low tire pressure warning and, subsequent to the generation of the low tire pressure warning, generating a prompt to request whether filling the portable pressure vessel is desired.

15. The method of claim 14, wherein the low tire pressure warning is displayed to the operator via one or more of the following: a graphic user interface in a passenger compartment and a mobile device via a cloud.

16. A method, comprising:
responsive to detecting a low tire pressure, displaying a low tire pressure indication to an operator and suggesting filling a portable pressure vessel;
responsive to receiving a first operator input requesting a portable pressure vessel fill, displaying an instruction set which includes coupling the portable pressure vessel to a connection port on an induction passage, the induction passage coupled between a compressor and an engine cylinder;
responsive to receiving a signal set detecting completion of the instruction set, prompting the operator to start the portable pressure vessel fill;
receiving a signal indicating a vehicle hood in a vehicle is closed; and
responsive to receiving a second operator input confirming to start filling the portable pressure vessel, adjusting engine operation to increase boost pressure for a temporary duration while the vehicle hood remains closed.

17. The method of claim 16, wherein the instruction set further includes parking the vehicle, maintaining an engine idle condition, securing the portable pressure vessel in a fill region, coupling the portable pressure vessel to the connection port, closing the vehicle hood, and instructing the operator to return to a driver seat.

18. The method of claim 16, wherein receiving the signal set detecting completion of the instruction set includes receiving signals from a plurality of vehicle sensors including one or more of a pedal position sensor, a transmission position sensor, a pick-up valve sensor, a hood latch sensor, and an occupancy sensor.

19. The method of claim 16, wherein adjusting engine operation comprises adjusting one or more actuators, the one or more actuators controlling a waste-gate valve coupled to a turbine of a forced induction system, a compressor recirculation valve coupled to a compressor of the forced induction system, an intake throttle coupled to the induction passage downstream of the compressor of the forced induction system, ignition timing, camshaft timing, auxiliary loads, and fuel injection.

* * * * *